United States Patent
Kamal et al.

(10) Patent No.: US 10,728,520 B2
(45) Date of Patent: Jul. 28, 2020

(54) METHODS AND SYSTEMS FOR GENERATING DEPTH DATA BY CONVERGING INDEPENDENTLY-CAPTURED DEPTH MAPS

(71) Applicant: Verizon Patent and Licensing Inc., Arlington, VA (US)

(72) Inventors: Syed Meeran Kamal, South Plainfield, NJ (US); Steven L. Smith, Putnam Valley, NY (US); Yongsheng Pan, Brooklyn, NY (US); Sergey Virodov, Fair Lawn, NJ (US); Jonathan A. Globerson, Aventura, FL (US); Lama Hewage Ravi Prathapa Chandrasiri, Franklin Park, NJ (US); Mohammad Raheel Khalid, Budd Lake, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/278,435

(22) Filed: Feb. 18, 2019

(65) Prior Publication Data
US 2019/0182472 A1 Jun. 13, 2019

Related U.S. Application Data

(63) Continuation of application No. 15/339,694, filed on Oct. 31, 2016, now Pat. No. 10,271,033.

(51) Int. Cl.
*H04N 13/156* (2018.01)
*G06T 5/50* (2006.01)
(Continued)

(52) U.S. Cl.
CPC ........... *H04N 13/156* (2018.05); *G01B 11/00* (2013.01); *G06T 5/50* (2013.01); *H04N 5/247* (2013.01);
(Continued)

(58) Field of Classification Search
CPC .... H04N 13/156; H04N 5/247; H04N 13/117; H04N 13/271; H04N 13/282;
(Continued)

(56) References Cited

U.S. PATENT DOCUMENTS 8,619,082 B1 * 12/2013 Ciurea .................. G06T 15/20
345/427
9,646,410 B2 * 5/2017 Collet Romea .... G06K 9/00214
(Continued)

*Primary Examiner* — James M Pontius

(57) ABSTRACT

An exemplary depth data generation system accesses first and second depth maps of a real-world scene, the depth maps independently captured using first and second depth map capture techniques, respectively. The first and second depth maps include, respectively, first and second depth data points both representative of a same physical point on a surface of an object in the real-world scene. Based on the first and second depth map capture techniques and based on an attribute of the surface of the object, the system assigns a first confidence value to the first depth data point and a second confidence value to the second depth data point. Based on the first and second confidence values, the system converges the first and second depth maps to form a converged depth map of the real-world scene that includes a third depth data point representing the physical point on the surface of the object.

20 Claims, 12 Drawing Sheets

(51) Int. Cl.
*H04N 5/247* (2006.01)
*H04N 13/117* (2018.01)
*H04N 13/271* (2018.01)
*H04N 13/282* (2018.01)
*G01B 11/00* (2006.01)
*G01B 11/24* (2006.01)

(52) U.S. Cl.
CPC ......... *H04N 13/117* (2018.05); *H04N 13/271* (2018.05); *H04N 13/282* (2018.05); *G01B 11/24* (2013.01); *G06T 2207/10028* (2013.01)

(58) Field of Classification Search
CPC .......... G01B 11/00; G01B 11/24; G06T 5/50; G06T 2207/10028
See application file for complete search history.

(56) References Cited

U.S. PATENT DOCUMENTS

| | | | | |
|---|---|---|---|---|
| 10,474,227 | B2* | 11/2019 | Carothers | G06F 3/04815 |
| 10,482,619 | B2* | 11/2019 | Ebrahimi Afrouzi | G06N 5/047 |
| 2007/0018977 | A1* | 1/2007 | Niem | G06T 7/571 345/422 |
| 2011/0025827 | A1 | 2/2011 | Shpunt et al. | |
| 2011/0298898 | A1* | 12/2011 | Jung | H04N 13/271 348/47 |
| 2012/0056982 | A1* | 3/2012 | Katz | G06F 3/017 348/43 |
| 2014/0184749 | A1 | 7/2014 | Hilliges et al. | |
| 2015/0145985 | A1 | 5/2015 | Gourlay et al. | |
| 2015/0332472 | A1* | 11/2015 | Govindarao | G06T 7/97 382/226 |
| 2016/0012633 | A1* | 1/2016 | Wei | G06T 17/05 345/420 |
| 2016/0019711 | A1 | 1/2016 | Shapira et al. | |
| 2016/0261844 | A1 | 9/2016 | Kadambi et al. | |
| 2017/0004649 | A1 | 1/2017 | Collet Romea et al. | |
| 2017/0302910 | A1* | 10/2017 | Richards | G06T 7/593 |
| 2017/0316570 | A1* | 11/2017 | Papadhimitri | G06T 7/557 |
| 2018/0091798 | A1* | 3/2018 | Chang | H04N 13/239 |
| 2018/0130210 | A1* | 5/2018 | Hall | G06T 7/11 |
| 2019/0057513 | A1* | 2/2019 | Jain | G06T 7/194 |
| 2019/0174118 | A1* | 6/2019 | Wei | G06T 7/521 |
| 2019/0197715 | A1* | 6/2019 | Rebecq | G06T 15/20 |
| 2019/0306489 | A1* | 10/2019 | Cheng | G06K 9/4609 |
| 2019/0354111 | A1* | 11/2019 | Cheng | H04W 4/40 |
| 2019/0356895 | A1* | 11/2019 | Varekamp | G06T 5/001 |
| 2020/0090358 | A1* | 3/2020 | Sun | G06T 7/97 |

* cited by examiner

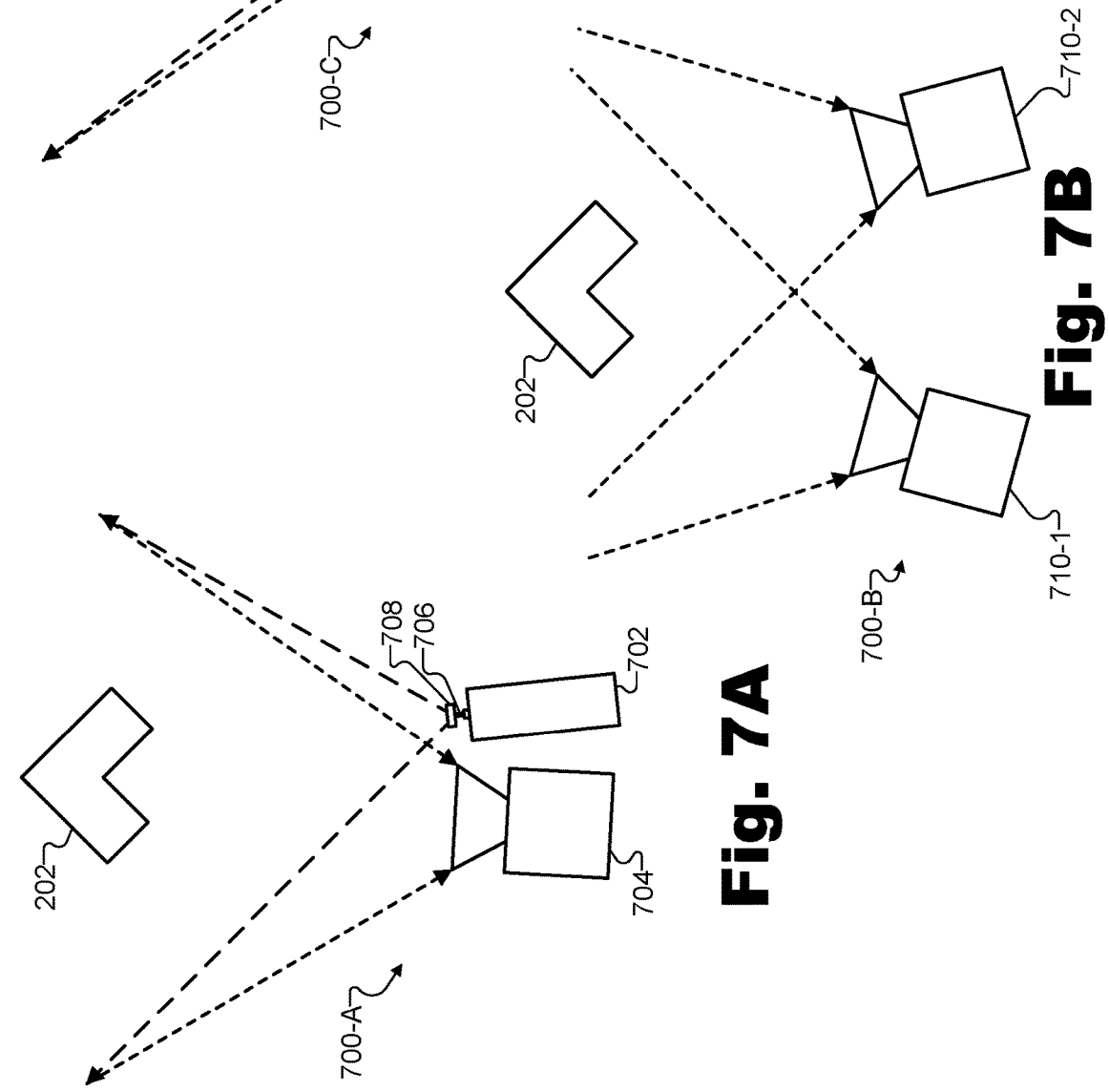

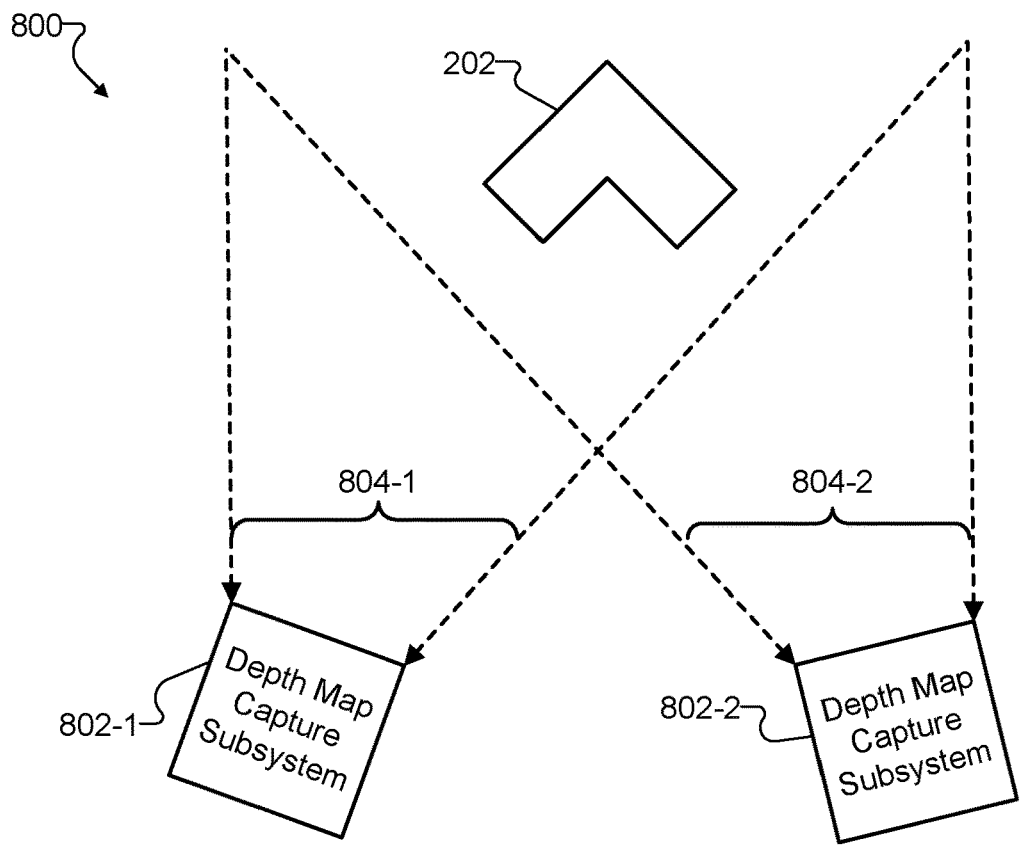
Fig. 8A
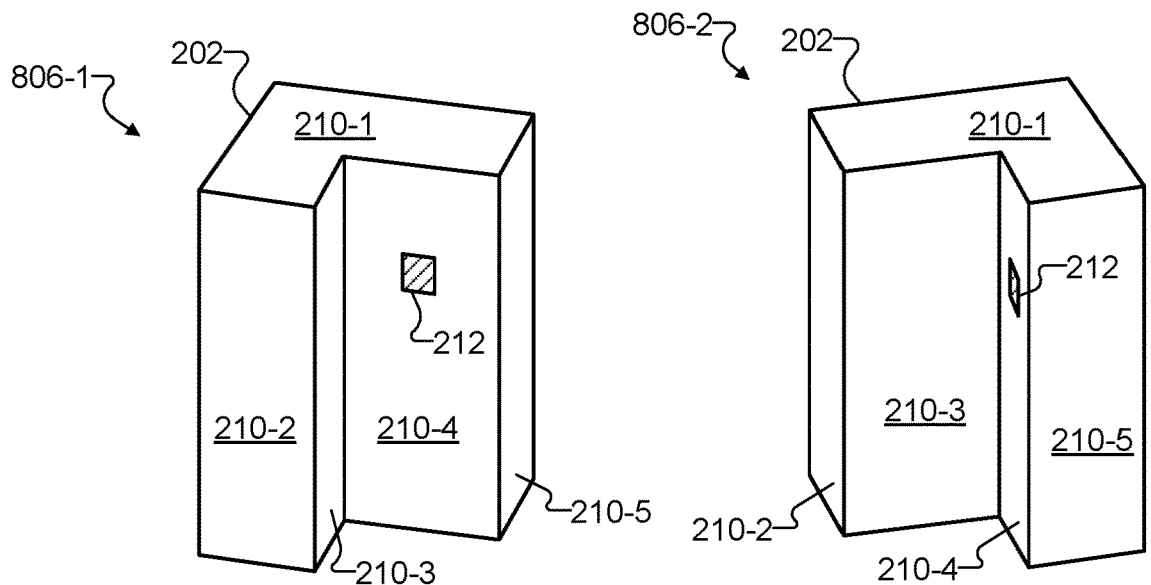
Fig. 8B                    Fig. 8C

US 10,728,520 B2

METHODS AND SYSTEMS FOR GENERATING DEPTH DATA BY CONVERGING INDEPENDENTLY-CAPTURED DEPTH MAPS

RELATED APPLICATIONS

This application is a continuation application of U.S. patent application Ser. No. 15/339,694, filed Oct. 31, 2016, and entitled "Methods and Systems for Generating Depth Data by Converging Independently-Captured Depth Maps," which is hereby incorporated by reference in its entirety.

BACKGROUND INFORMATION

Depth data (e.g., spatial location data, positional coordinate data, etc.) representative of surfaces of objects in the world may be useful in various applications. For example, depth data representative of objects in a real-world scene may be used to generate virtual reality content that includes an immersive virtual reality world that mimics the real-world scene. Accordingly, users (e.g., people using the virtual reality content by way of a media player device) may virtually experience the real-world scene by viewing and/or interacting with any of a variety of things being presented in the immersive virtual reality world.

Current techniques for capturing depth data may have room for improvement, particularly in the context of capturing depth data representative of objects included in a real-world scene in virtual reality applications. For example, while various fixed positions with respect to the real-world scene (e.g., various perspectives, angles, vantage points, etc., on the real-world scene) and/or various different depth capture techniques may potentially be available for capturing depth data representative of objects in the real-world scene, a fixed position and/or a depth capture technique that may be ideal for capturing depth data representative of a particular object or surface of an object in the real-world scene may be different from a fixed position and/or a depth capture technique that would be ideal for capturing depth data representative of a different particular object or another surface of the object in the real-world scene. Accordingly, regardless of which depth capture technique and/or which fixed position is used to capture depth data for a particular real-world scene, depth data captured to represent at least some objects and/or surfaces of objects in the real-world scene may be inaccurate, imprecise, suboptimal, deficient, or otherwise leave room for improvement.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 7A-7C illustrate exemplary depth map capture techniques according to principles described herein.

FIG. 8A illustrates exemplary components of another exemplary implementation of the depth data generation system of FIG. 1 generating depth data by converging independently-captured depth maps according to principles described herein.

FIGS. 8B-8C illustrate perspective views of the object of FIG. 8A from the perspective of the depth map capture subsystems of FIG. 8A according to principles described herein.

DETAILED DESCRIPTION OF PREFERRED EMBODIMENTS

Figure 1:
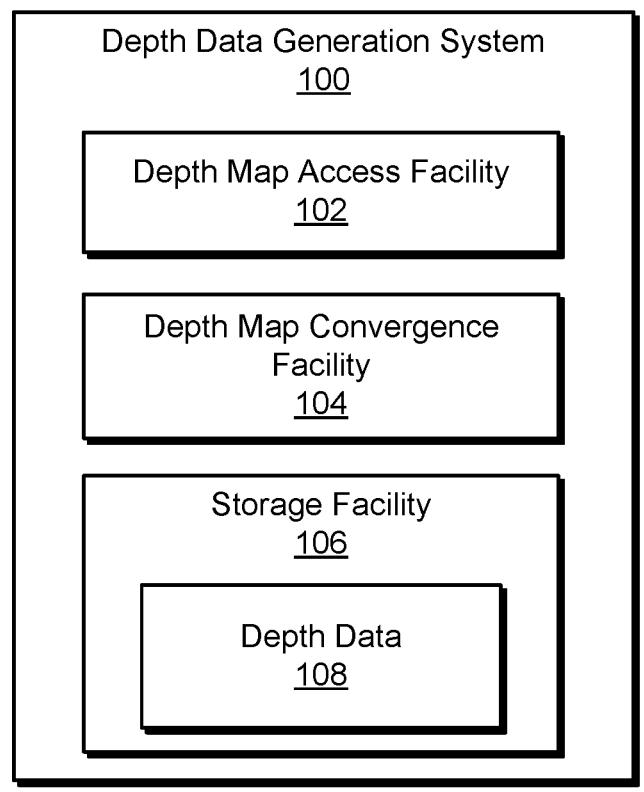
FIG. 1 illustrates an exemplary depth data generation system for generating depth data by converging independently-captured depth maps according to principles described herein.

Methods and systems for generating depth data by converging independently-captured depth maps are described herein. As used herein, "depth data" may broadly include any spatial location data, positional coordinate data, or other data representative of a position of one or more surfaces (e.g., or, more particularly, one or more physical points on the surfaces) of one or more objects in three-dimensional ("3D") space. For example, as will be described and illustrated below, depth data may include data representative of surfaces of objects included in a real-world scene. Depth data may be captured in various ways and/or by way of various techniques including by methods and systems described herein. In certain examples, depth data may be combined and/or synchronized with video data (e.g., two-dimensional ("2D") video data) to generate a dynamic volumetric model of the surfaces of objects that incorporates the depth data and the video data over a period of time. Such volumetric models may be used to generate virtual reality content such as, for example, virtual reality content including an immersive virtual reality world representative of a real-world scene that includes the objects. Examples of depth data, techniques for capturing depth data, and uses for depth data are described herein.

In some examples, depth data may be captured, generated, stored, transmitted, or otherwise created or processed in the form of or as part of a "depth map." As used herein, a depth map may be representative of at least one surface of an object (e.g., an object included within a real-world scene) by including or implementing depth data (e.g., depth data points each representative of a particular physical point on a surface of an object) that describes the spatial location, positional coordinates, etc., for the surface of the object. For example, a depth map may represent particular surfaces of various objects included within a real-world scene, where the particular surfaces are the surfaces of the objects that may be seen from one particular fixed position or perspective. Thus, a depth map may not include all the depth data that may be used to fully model all the surfaces of an object (e.g., all the surfaces of the object that may be observed from all vantage points around the object), but, rather, may include a portion of the depth data that may be used to fully model all the surfaces of the object.

In certain examples, depth maps may be captured from different fixed positions (e.g., different vantage points or perspectives) with respect to the real-world scene, by way of different depth map capture techniques (e.g., different technologies for capturing depth data, examples of which will be provided below), and/or by different depth map capture subsystems. Such depth maps may be referred to herein as being "independently captured" if one depth map does not derive from or otherwise rely on the other depth map. As will be described below in more detail, multiple independently-captured depth maps may be converged (e.g., merged, combined, etc.) to form converged depth maps that are more accurate, more comprehensive (e.g., covering more perspectives), and/or otherwise superior to the independently-captured, non-converged depth maps.

In order to generate depth data by converging independently-captured depth maps, a depth data generation system may access a first depth map of surfaces of objects included in a real-world scene and a second depth map of the surfaces of the objects included in the real-world scene, where the second depth map is captured independently from the first depth map (e.g., captured from a different fixed position, by way of a different depth map capture technique, by a different depth map capture subsystem, etc.). The first depth map may include a first plurality of depth data points each representative of a different physical point included in a plurality of physical points on the surfaces of the objects included in the real-world scene. Similarly, the second depth map may include a second plurality of depth data points each representative of a different physical point included in the plurality of physical points on the surfaces of the objects included in the real-world scene. In other words, the first and second pluralities of depth data points included within the first and second depth maps, respectively, may represent the same plurality of physical points on the surfaces of the objects included in the real-world scene as independently captured from different fixed positions and/or by way of different depth map capture techniques.

As referred to herein, a "plurality of physical points" on the surfaces of the objects may refer to physical points that may be detected from perspectives of at least two fixed positions at which depth map capture subsystems are positioned to capture depth data. In other words, by definition, each physical point in the plurality of physical points may be represented by at least one depth data point in the first plurality of depth data points included in the first depth map and one depth data point in the second plurality of depth data points included in the second depth map. However, it will be understood that, due to circumstances associated with each independent capturing of the depth data points (e.g., the perspectives from which the depth data points are captured, etc.), various physical points on the surfaces of the objects may not be represented by any depth data point in the first or second depth data map (e.g., physical points on a surface that is not facing the fixed positions from which the first and second depth maps are captured). Additionally, and for the same or similar reasons, it will be understood that the first depth map may include certain depth data points that represent physical points on the surfaces of the object that are not represented by corresponding depth data points included in the second depth map, and vice versa.

The depth data generation system may converge the first and second depth maps into a converged depth map of the surfaces of the objects included in the real-world scene. For example, the converged depth map may include a third plurality of depth data points each representative of a different physical point included in the plurality of physical points on the surfaces of the objects included in the real-world scene (i.e., the same plurality of physical points represented in both the first and the second depth maps). The converging may include assigning a first confidence value to a first depth data point in the first plurality of depth data points of the first depth map, and assigning a second confidence value to a second depth data point in the second plurality of depth data points of the second depth map. The first depth data point and the second depth data point may each represent a same particular physical point included in the plurality of physical points on the surfaces of the objects included in the real-world scene. Then, the converging may include generating, based on the first and second confidence values and on at least one of the first depth data point and the second depth data point, a third depth data point (e.g., in the third plurality of depth data points) representing the particular physical point. Examples of generating depth data representative of the surface of the objects by converging independently-captured depth maps, as well as uses for the generated depth data, will be described in more detail below.

As used herein, a "real-world scene" may refer to any real-world scenery, real-world location, real-world event (e.g., live event, etc.), or other subject existing in the real world (e.g., as opposed to existing only in a virtual world) as may serve a particular implementation. For example, the real-world scene may include any indoor or outdoor real-world location such as the streets of a city, a museum, a scenic landscape, a satellite orbiting and looking down upon the Earth, the surface of another planet, or the like. In certain examples, the real-world scene may be associated with a real-world event such as a sporting event (e.g., a basketball game, an Olympic event, etc.), a concert (e.g., a rock concert in a large venue, a classical chamber concert in an intimate venue, etc.), a theatrical presentation (e.g., a Broadway musical, an outdoor pageant, etc.), a large-scale celebration (e.g., New Year's Eve on Times Square, Mardis Gras, etc.), a race (e.g., a stock-car race, a horse race, etc.), a political event (e.g., a presidential debate, a political convention, etc.), or any other real-world event that may interest potential users. In the same or other examples, the real-world scene may be associated with a setting for a fictionalized scene (e.g., a set of a live-action virtual reality television show or movie) and/or any other scene at any other indoor or outdoor real-world location as may serve a particular implementation.

Accordingly, as used herein, an "object" included in a real-world scene, may include anything, whether living or inanimate, that is associated with the real-world scene (e.g., located within or around the real-world scene) and that is visible from a particular viewpoint with respect to the real-world scene. For example, if the real-world scene includes a real-world event such as a basketball game, objects for which depth data of the object surfaces may be captured may include the basketball being used for the game, the basketball court, the basketball standards (i.e., the backboards, rims, nets, etc.), the players and referees participating in the game, and/or other objects present at and/or associated with the basketball game.

By converging independently-captured depth maps to generate depth data in accordance with methods and systems described herein, a depth data generation system may provide and/or benefit from various advantages. For example, a depth data generation system described herein may generate more accurate, precise, optimal, and/or comprehensive depth maps than may be possible using conventional systems for capturing depth data. More specifically, conventional systems for capturing depth data may be constrained to represent each physical point on a surface of an object based on a single depth map capture technique performed from a single fixed position. In contrast, as will be described in more detail below, depth data generation methods and systems described herein may generate depth data that incorporates, within one converged depth map, depth data captured from various fixed positions and/or captured by way of various depth map capture techniques so that each depth data point included in the converged depth map may be optimized (e.g., more accurate, more precise, etc.) for each physical point on the surface of the object. In other words, the methods and systems described herein allow the benefits of a variety of perspectives and depth map capture techniques to be used and represented in a single depth map so as to avoid potential drawbacks of any single perspective or depth map capture technique in capturing the depth data points for a depth map.

Moreover, by facilitating the generation of improved depth data (e.g., more accurate, precise, and/or comprehensive depth maps), the systems and methods described herein may also facilitate improved modeling based on the depth data. For example, by using optimized depth data, a depth data generation system or another system associated with the depth data generation system may generate a dynamic volumetric model of the surfaces of objects in the real-world scene more accurately than was possible previously. As a result, virtual reality media content representative of the real-world scene generated based on the dynamic volumetric model of the surfaces of the objects may also be improved.

One or more of these advantages may ultimately benefit an end user of the depth data (e.g., a user experiencing an immersive virtual reality world generated based on the generated depth data) by providing a higher quality (e.g., more realistic) experience to the end user. For example, in applications involving virtual reality media content representative of a volumetric model of the real-world scene, the user may become immersed in the real-world scene to an extent that may not be possible for people presented with the real-world scene by way of traditional media (e.g., television) or traditional virtual reality media. Volumetric models of the real-world scene may allow users to dynamically and arbitrarily move their viewpoint within the real-world event, thus providing the users with an experience of the real-world event not even available to people physically present at the real-world scene (e.g., people attending a real-world event).

For example, users may be able to experience a live basketball game as if running up and down the court with the players, or experience a live concert as if standing on stage next to the performers.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary depth data generation system 100 ("system 100") for generating depth data by converging independently-captured depth maps. As shown, system 100 may include, without limitation, a depth map access facility 102, a depth map convergence facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. Each of facilities 102 through 106 may be distributed between multiple devices and/or multiple locations as may serve a particular implementation. Each of facilities 102 through 106 will now be described in more detail.

Depth map access facility 102 may include any hardware and/or software (e.g., computing systems and devices, computing software, depth capture devices, etc.) configured to access one or more independently-captured depth maps that each include a respective plurality of depth data points (e.g., depth data points each representative of a different physical point included in a plurality of physical points on the surfaces of objects included in a real-world scene). Depth map access facility 102 may access a depth map in any way described herein and/or as may serve a particular implementation. For example, in some implementations, depth map access facility 102 may access a depth map by receiving the depth map (e.g., from another device or system that captures and transmits the depth map to system 100), by loading the depth map from a location where the depth map is stored (e.g., from depth data 108 in storage facility 106), or by otherwise accessing data representative of the depth map after the depth map has been captured (e.g., by system 100 or by another system). In the same or other implementations, depth map access facility 102 may access the depth map by directly capturing the depth map. In other words, depth map access facility 102 may include depth capture devices that may be configured to scan, detect, analyze, determine, and otherwise capture (e.g., by way of a particular depth map capture technique) the depth map of the real-world scene directly from the objects included in the real-world scene.

For example, in certain implementations, the accessing of a first depth map may include capturing the first depth map by way of a first depth map capture technique, and the accessing of a second depth map may include capturing the second depth map by way of a second depth map capture technique that is different from the first depth map capture technique. For example, as will be described in more detail below, two different depth map capture techniques may be performed from similar or the same fixed positions to generate independently-captured depth maps that complement one another due to different strengths characterizing the different depth map capture techniques.

In other implementations, the accessing of the first depth map may include capturing the first depth map by way of a particular depth map capture technique, and the accessing of the second depth map may include capturing the second depth map by way of the same depth map capture technique.

For example, as will be described in more detail below, the same depth map capture technique may be performed from two different fixed positions to generate independently-captured depth maps that complement one another due to different vantage points (i.e., different perspectives or angles from which depth data for various surfaces of various objects within the real-world scene may be captured) that are provided by the different fixed positions from which the depth map capture techniques are performed.

In yet other implementations, the accessing of the first and second depth maps may include capturing the first and second depth maps by way of different depth map capture techniques performed from different fixed positions, or by way of the same depth map capture technique performed from the same or similar fixed positions, as may serve a particular implementation. Examples of accessing depth maps (including by capturing the depth maps) will be described in more detail below.

Depth map convergence facility 104 may include any suitable hardware and/or software (e.g., computing systems and devices, computing software, etc.) configured to converge independently-captured depth maps of surfaces of objects included in a real-world scene into a converged depth map of the surfaces of the objects. For example, based on first and second depth maps that include, respectively, first and second pluralities of depth data points each representative of different physical points included in a plurality of physical points on the surfaces of the objects, depth map convergence facility 104 may form a converged depth map that includes a third plurality of depth data points each representative of the different physical points included in the plurality of physical points represented by the first and second pluralities of depth data points.

Depth map convergence facility 104 may converge independently-captured depth maps in any way described herein and/or as may serve a particular implementation. For example, referring to the example above where depth map convergence facility 104 converges the first and second depth maps into the converged depth map, depth map convergence facility 104 may assign a first confidence value to a first depth data point in the first plurality of depth data points of the first depth map, the first depth data point representing a particular physical point included in the plurality of physical points. Depth map convergence facility 104 may similarly assign a second confidence value to a second depth data point in the second plurality of depth data points of the second depth map, the second depth data point also representing the particular physical point.

As used herein, "confidence values" may be assigned by system 100 (e.g., by depth map convergence facility 104) to depth data points that are accessed (e.g., captured, loaded, etc.) by system 100 to indicate how likely each depth data point is to accurately reflect the reality (e.g., the actual position, the actual depth with respect to an element of a depth map capture subsystem performing the detection, etc.) of the physical point to which the depth data point corresponds. Confidence values may be numerical values (e.g., percentage values, numbers on a particular scale, etc.), binary pass/fail-type values, or any other type of value as may serve a particular implementation. For example, if system 100 determines that a particular depth data point may be relatively likely to accurately reflect an actual depth of a physical point on a surface of an object (e.g., an actual position of the physical point in 3D space, an actual depth or distance of the physical point from the element of the depth map capture subsystem performing the detection, etc.), system 100 may assign that particular depth data point a relatively high confidence value (e.g., an 80% value, a PASS value, etc.). Conversely, if system 100 determines that a particular depth data point may be relatively less likely to accurately reflect the actual depth of the physical point (e.g., to represent a relatively "rough estimate" of the actual position or depth), system 100 may assign that particular depth data point a relatively low confidence value (e.g., a 20% value, a FAIL value, etc.). Examples of confidence values and how system 100 determines and assigns confidence values will be described in more detail below.

After assigning the respective first and second confidence values to the respective first and second depth data points, depth map convergence facility 104 may generate, based on the first and second confidence values and on at least one of the first depth data point and the second depth data point, a third depth data point (e.g., to be part of the third plurality of depth data points) that, like the first and second depth data points, also represents the particular physical point on the particular surface of the object. For example, as will be described in more detail below, depth map convergence facility 104 may generate the third depth data point by relying exclusively or more heavily on whichever of the first and second depth data points is more likely to be accurate, based on the respective first and second confidence values. This process of assigning confidence values and generating a converged depth data point based on the confidence values and on other respective depth data points may be performed for depth data points corresponding to any and/or every particular physical point included in the plurality of physical points on the surfaces of the objects. In this way, a converged depth map representative of the surfaces of the objects may be formed that may be more accurate and/or otherwise superior to both or either of the first and second depth maps. Examples of generating depth data points based on other depth data points and respective confidence values to form converged depth maps will be provided below.

As mentioned above, it will be understood that additional facilities not explicitly shown in FIG. 1 may also be included within system 100 as may serve a particular implementation. For example, in certain embodiments, system 100 may include or may be associated with one or more facilities configured to generate, process, distribute, transmit, store, load, or otherwise manage or handle depth data representative of the surfaces of the objects included in the real-world scene. Such facilities within system 100, or systems associated with system 100 that include such facilities, may distribute depth data accessed or generated by facilities 102 or 104 and/or perform additional processing on the depth data to convert the depth data into a useful form such as a comprehensive converged depth map of part or all of the real-world scene, a dynamic volumetric model of the surfaces of the objects included in the real-world scene, renderable virtual reality content that mimics the real-world scene, or the like. Specifically, for example, a data stream representative of a dynamic volumetric model of the surfaces of the objects included in the real-world scene may be generated. The dynamic volumetric model of the surfaces of the objects in the real-world scene may be configured to be used to generate virtual reality media content representative of the real-world scene as experienced from a dynamically selectable viewpoint corresponding to an arbitrary location within the real-world scene. For example, the dynamically selectable viewpoint may be selected by a user of a media player device while the user is experiencing the real-world scene using the media player device. These types of additional facilities or associated systems may also provide, to the media player device based on the generated data stream, the virtual reality media content representative of the real-world scene as experienced from the dynamically selectable viewpoint corresponding to the arbitrary location within the real-world scene.

Storage facility 106 may maintain depth data 108 and/or any other data received, generated, accessed, managed, maintained, used, and/or transmitted by facilities 102, 104, or any other facilities that may be included in system 100 in a particular implementation. Depth data 108 may include depth data representative of the surfaces of the objects included in the real-world scene (e.g., accessed or captured by depth map access facility 102, generated by depth map convergence facility 104, etc.). Examples of depth data will be provided and illustrated below. In some examples, along with depth data 108, storage facility 106 may further include other data, such as data representative of a volumetric model (e.g., a real-time, 4D model) of the real-world scene, any part of which may be presented to a user from any arbitrary viewpoint selected by the user. As such, system 100 may provide virtual reality media content representative of the real-world event as experienced from a dynamically selectable viewpoint corresponding to an arbitrary location at the real-world event by providing different parts of depth data 108 and/or other data included within storage facility 106 to different media player devices based on dynamically selectable viewpoints that are selected by different respective users of the media player devices. Storage facility 106 may further include any other data as may be used by facilities 102, 104, or other additional facilities to generate depth data by converging independently-captured depth maps and/or to create or distribute a volumetric representation of the real-world scene in any way as may serve a particular implementation.

In order to generate depth data by converging independently-captured depth maps as described herein, system 100 may use (e.g., include, communicate with, etc.) one or more depth map capture subsystems configured to analyze a real-world scene to capture depth data representative of surfaces of objects included within the real-world scene.

Figure 2A:
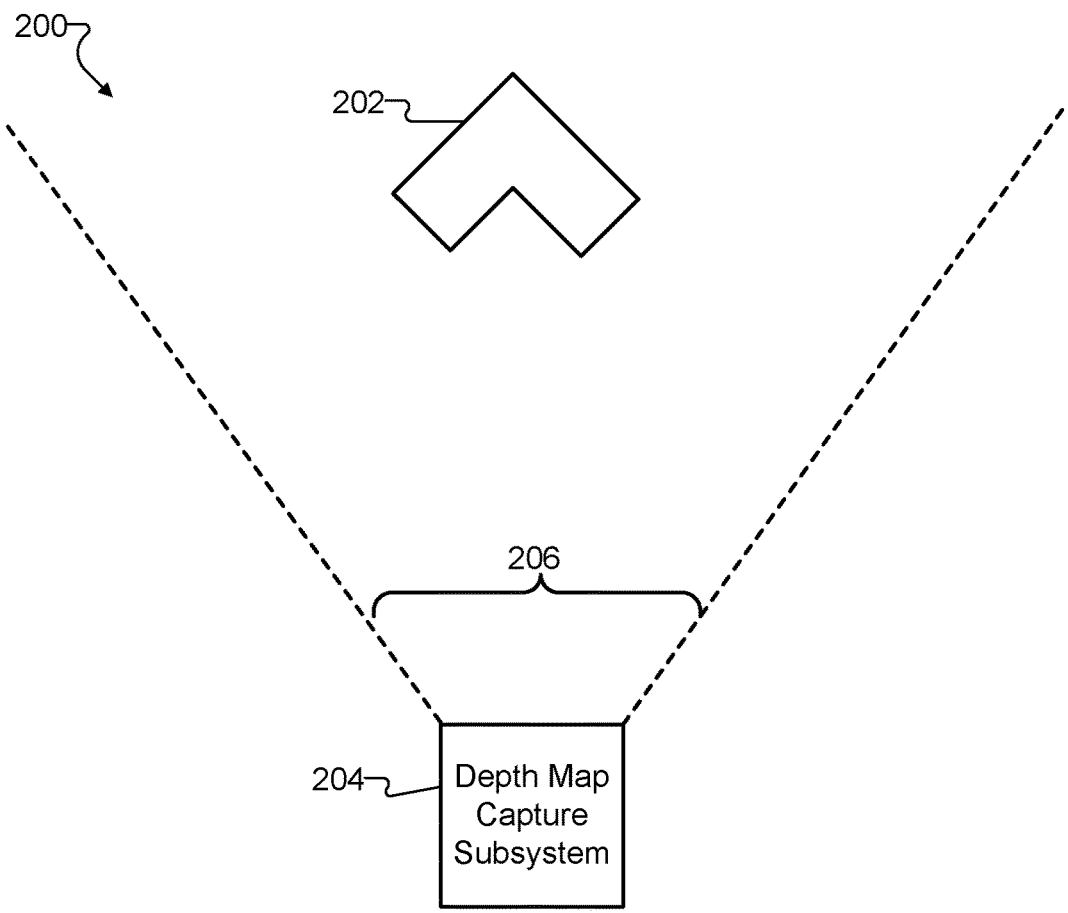
FIG. 2A illustrates an exemplary configuration in which depth data representative of exemplary surfaces of an object in a real-world scene is captured by an exemplary depth map capture subsystem according to principles described herein.

To illustrate, FIG. 2A shows an exemplary configuration 200 in which depth data representative of exemplary surfaces of an object 202 in a real-world scene is captured by an exemplary depth map capture subsystem 204. Configuration 200 illustrates a top view of depth map capture subsystem 204 along with object 202.

Object 202 may be included within a real-world scene (not explicitly demarcated in FIG. 2A) and may represent any type of object described herein. For example, while object 202 is drawn as a relatively simple geometric shape for the sake of clarity, it will be understood that object 202 may represent various types of objects having various levels of complexity. Rather than a geometric shape, for instance, object 202 could represent a person or another living thing, a non-transparent solid, liquid, or gas, a less discrete object such as a wall, a ceiling, a floor, or any other type of object described herein or as may serve a particular implementation.

As shown, object 202 may include various surfaces that may each reflect light such that depth map capture subsystem 204 may capture depth data representative of the surfaces by, for example, detecting, estimating, or otherwise determining the depth data in accordance with a particular depth map capture technique such as those described herein. While object 202 is relatively simple, the depth of the surfaces of object 202 may appear different based on a position from which the depth of the surfaces is captured (e.g., a fixed position of depth map capture subsystem 204 with respect to object 202). In other words, object 202 may look different based on a perspective or position from which object 202 is viewed. Accordingly, to fully model object 202, depth data representative of object 202 from various perspectives relative to (e.g., surrounding) object 202 may be used.

Depth map capture subsystem 204 may include any suitable hardware or combination of hardware and software configured to capture a depth map of object 202 from a fixed position at which depth map capture subsystem 204 is disposed. More specifically, depth map capture subsystem 204 may include hardware devices such as optical emitters (e.g., lasers or other devices for generating stimulated emission of electromagnetic radiation at a suitable frequency, camera flash equipment or other devices for generating pulses of light to bathe a real-world scene in light, etc.), optical sensors (e.g., video cameras, infrared ("IR") sensors, time-of-flight sensors, etc.), and other hardware equipment configured to perform at least one depth map capture technique for capturing a depth map representative of surfaces of objects (e.g., such as object 202) within a real-world scene. Depth map capture subsystem 204 may further include software associated with any of the devices or equipment mentioned above or that is configured to run on a general or specific purpose processor included within depth map capture subsystem 204. As such, depth map capture subsystem 204 may be configured to perform one or more depth map capture techniques to capture depth data representative of object 202. Specific examples of depth map capture techniques that may be performed by depth map capture subsystem 204 will be described below.

In certain examples, depth map capture subsystem 204 may be included within system 100 such that accessing a depth map by system 100 includes capturing the depth map using depth map capture subsystem 204. In other examples, depth map capture subsystem 204 may be separate from system 100 (e.g., included within a separate system communicatively coupled with or otherwise associated with system 100) such that accessing the depth map by system 100 includes receiving the depth map from depth map capture subsystem 204 (e.g., after depth map capture subsystem 204 has captured and transmitted the depth map to system 100). As such, depth map capture subsystem 204 may perform additional functionality described above with respect to system 100.

For example, along with capturing or otherwise facilitating the accessing of at least one depth map, depth map capture subsystem 204 may also assign or facilitate assigning confidence values to depth data points included within the depth map. Specifically, for instance, depth map capture subsystem 204 may analyze data captured from the real-world scene to identify one or more attributes of various surfaces of object 202 in order to determine a confidence (e.g., a relative likelihood, a degree of certainty, etc.) that depth data captured to represent particular physical points on the surfaces of object 202 is accurate. Similarly, depth map capture subsystem 204 may analyze a viewing perspective associated with the fixed position at which depth map capture subsystem 204 is disposed to further assess the confidence that the depth data captured to represent the particular physical points is accurate. Examples of determining and assigning confidence values will be described below.

Depth map capture subsystem 204 may be associated with a particular scope of capture 206, illustrated in configuration 200 by dotted lines emanating from depth map capture subsystem 204 to broadly encompass object 202 and an area around object 202. Scope of capture 206 may be limited by various characteristics of depth map capture subsystem 204 and/or the equipment and devices included within depth map capture subsystem 204. For example, if depth map capture subsystem 204 includes one or more optical sensors that have a finite angle of view (e.g., a 90° by 60° angle of view), the finite angle of view of the optical sensors may limit scope of capture 206 of depth map capture subsystem 204 such that scope of capture 206 includes parts of a real-world scene in front of depth map capture subsystem 204, but not necessarily all the way around (e.g., to the sides and/or behind) depth map capture subsystem 204. Scope of capture 206 may be any scope as may serve a particular implementation. For example, while configuration 200 illustrates a limited, directional scope of capture 206 in front of depth map capture subsystem 204, other examples may include a 360° scope of capture (e.g., an annular ring around depth map capture subsystem 204 or a complete sphere around depth map capture subsystem 204) or any other suitable scope of capture as may serve a particular implementation.

Figure 2B:
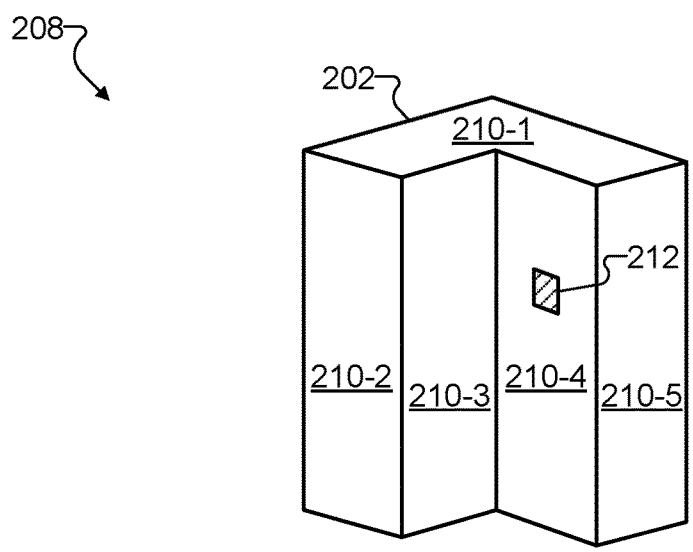
FIG. 2B illustrates a perspective view of the object of FIG. 2A from the perspective of the depth map capture subsystem of FIG. 2A according to principles described herein.

FIG. 2B illustrates a perspective view 208 of object 202 from the perspective of depth map capture subsystem 204. In view 208, various surfaces of object 202 (i.e., surfaces 210-1 through 210-5) are shown. It will be understood that other surfaces of object 202 may also exist that may not be visible from the perspective of view 208 (i.e., from a vantage point of a fixed position at which depth map capture subsystem 204 is disposed). Each surface 210 may include a plurality of physical points for which depth data may be captured by depth map capture subsystem 204. For example, an exemplary physical point 212 is called out on surface 210-4. Physical point 212 will be referred to below to help explain how system 100 may generate depth data by independently capturing and then converging depth maps. However, it will be understood that physical point 212 is an arbitrary, exemplary point only. The principles described with respect to physical point 212 may apply to any and all physical points on any and all surfaces 210 of object 202, as well as to other physical points on other surfaces of other objects included within the real-world scene.

The surfaces of one or more objects that may be captured by a depth map capture subsystem of a depth data generation system may be determined based on a fixed position with respect to the objects at which the depth map capture subsystem is disposed. For example, as illustrated in FIG. 2B, depth map capture subsystem 204 may capture depth data point representative of particular physical points (e.g., such as physical point 212) on surfaces 210-1 through 210-5 of object 202 because the fixed position and orientation of depth map capture subsystem 204 is such that scope of capture 206 faces surfaces 210-1 through 210-5. In order to capture depth data representative of all the surfaces of object 202, as well as to capture depth data representative of other objects within the real-world scene and/or to capture the depth data from perspectives associated with relatively high confidence values (e.g., perspectives from which surfaces can be analyzed relatively "straight-on" rather than at a sharp angle), a plurality of depth map capture subsystems similar to depth map capture subsystem 204 may be used. For example, the plurality of depth map capture subsystems may be distributed across a plurality of nodes included within a configuration of system 100, each of the nodes disposed at different fixed node positions (e.g. different fixed node positions varying along any axis of 3D space or varying in distance from a real-world scene) in a plurality of fixed node positions with respect to (e.g., surrounding or partially surrounding) the real-world scene.

Figure 3:
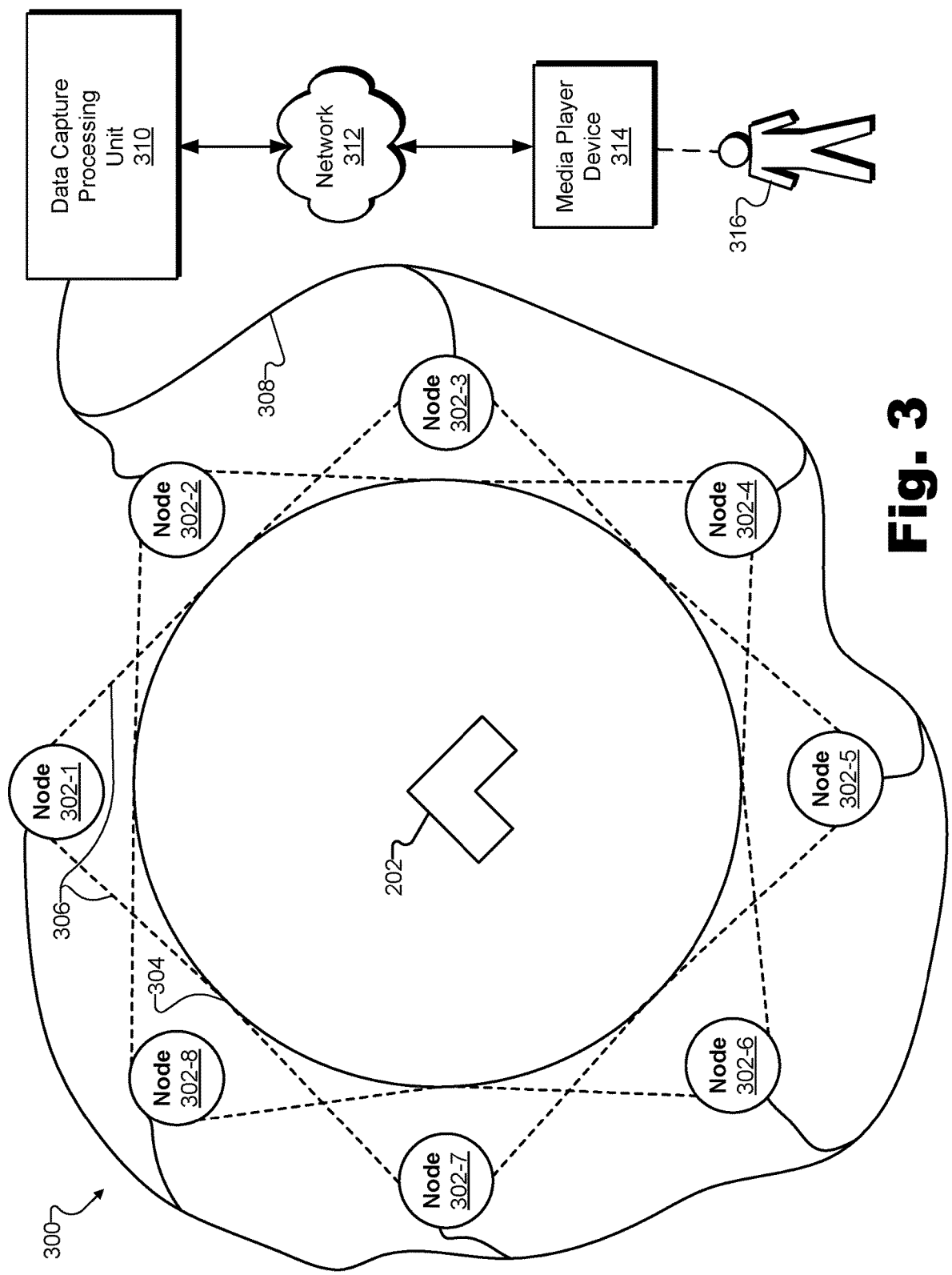
FIG. 3 illustrates an exemplary implementation of the depth data generation system of FIG. 1 positioned with respect to an exemplary real-world scene in order to generate depth data by converging independently-captured depth maps according to principles described herein.

To illustrate, FIG. 3 shows an exemplary implementation 300 of system 100 positioned with respect to an exemplary real-world scene in order to generate depth data by converging independently-captured depth maps. More specifically, implementation 300 of system 100 includes a plurality of nodes 302 (i.e., nodes 302-1 through 302-8) disposed at fixed node positions with respect to (e.g., in this case, surrounding) a real-world scene 304 that includes object 202, described above in relation to FIGS. 2A and 2B.

Each of nodes 302 may include or implement one or more depth map capture subsystems such as depth map capture subsystem 204 described above with respect to system 200. For example, each node 302 may include equipment and/or devices for performing at least one depth map capture technique (described in more detail below) to capture a depth map, hardware and/or software for determining and assigning respective confidence values to each depth data point included within the depth map, and/or other elements described above with respect to depth map capture subsystem 204 as may serve a particular implementation. Additionally, since implementation 300 is an implementation of system 100, one or more elements described above with respect to system 100 or described below with respect to other implementations of system 100 may also be included within one or more of nodes 302.

Accordingly, each node 302 may be configured to perform operations such as those described and illustrated above with respect to system 100 and/or system 200. Specifically, for example, each node 302 may access (e.g., capture, receive, load, etc.) first and second depth maps representative of different physical points included in a plurality of physical points on the surfaces of objects such as object 202 included in real-world scene 304. Additionally, each node 302 may be configured to converge two or more depth maps (e.g., the first and second depth maps) into a converged depth map representative of the physical points included in the plurality of physical points on the surfaces of objects in real-world scene 304.

As shown, because of the different fixed node positions of nodes 302 of implementation 300, each node 302 may be associated with a unique perspective of object 202 such that the surfaces of object 202 may be detected from various perspectives surrounding object 202 and each node 302 may detect characteristics of the surfaces of object 202 that would be difficult or impossible to detect from the fixed node positions of other nodes 302. To illustrate, each node 302 includes dotted lines emanating therefrom representative of the scope of capture of the particular node 302. Specifically, for example, a scope of capture 306 of node 302-1 is explicitly labeled in FIG. 3. In the setup of implementation 300, each of nodes 302 may be positioned so as to capture all or substantially all of the circular area designated as real-world scene 304 from the perspective (i.e., angle, distance, etc.) afforded by the respective fixed node position of the node. For example, all of the respective areas of nodes 302 may be overlapping with the respective areas of all the other nodes 302 in an area (e.g., a circular area) designated as real-world scene 304.

It will be understood, however, that in other examples, a real-world scene may not be circular and each of nodes 302 may not capture all or substantially all of the real-world scene from a particular perspective. For example, a real-world scene may be round (e.g., circular, elliptical, etc.) or non-round (e.g., a shape having corners such as a triangle, square, or other polygon). Additionally, as will be illustrated below with respect to FIG. 5, a real-world scene may be elongated such that one side of the real-world scene may be significantly longer than another (e.g., rectangular like a basketball court, stretched out like a racetrack, etc.). Accordingly, in certain examples, each node of an implementation of system 100 may be associated with an area that includes a portion (e.g., a horizontal portion, a vertical portion, etc.) of the real-world scene that is smaller than the entire real-world scene. As such, various portions of the real-world scene associated with each node may overlap with other portions of the real-world scene (e.g., portions of the real-world scene associated with neighboring nodes) but may not necessarily overlap with every other portion of the real-world scene associated with every other node.

In FIG. 3, a plurality of eight nodes 302 are illustrated to be surrounding real-world scene 304 and object 202. It will be understood that this number of nodes is exemplary only and that any number of nodes 302 as may serve a particular implementation may be used in various examples. Additionally, while nodes 302 are illustrated as completely surrounding real-world scene 304, it will be understood that, in certain implementations, nodes 302 may be located in fixed node positions with respect to real-world scene 304 that do not necessarily surround real-world scene 304. For example, if real-world scene 304 represents a stage where a play is being performed, nodes 302 may be located in fixed node positions with respect to real-world scene 304 in front of the stage but may not completely surround the stage in back. In certain examples, real-world scene 304 may include several areas (e.g., geographical areas) of particular interest to users along with other areas of relatively less interest. As such, nodes 302 may be distributed to cover several distinct (i.e., non-touching) areas. For example, real-world scene 304 may include a racetrack that is several miles long and nodes 302 may be disposed at fixed node positions associated only with particular turns of the racetrack and/or the starting line, the finish line, the pits, and/or other areas of interest along the racetrack.

Nodes 302 may be communicatively coupled by a connection 308 (e.g., which may represent any wired or wireless direct or network connection as may serve a particular implementation) to one another and/or to another device such as to a data capture processing unit 310. This may allow nodes 302 to maintain synchronicity in time, position, angle, etc. so that a dynamic volumetric model of the surfaces of objects included within real-world scene 304 (e.g., including object 202) may be generated. For example, nodes 302 may send and receive timing signals to ensure that each node 302 detects corresponding data at the same time and that the data detected by different nodes 302 may be timestamped with a universal time shared by all of nodes 302 in system 100. In other embodiments, audio, video, and/or other cues may be used by each node 302 to ensure that each node 302 detects corresponding data at the same time.

Data capture processing unit 310 may either be included within or communicatively coupled to implementation 300 of system 100 as may serve a particular implementation. Data capture processing unit 310 may include one or more computing resources configured to assign confidence values to particular depth data points included within depth maps, to generate additional depth data points based on the particular depth data points and/or the confidence values assigned to the particular depth data points, and/or to otherwise converge independently-captured depth maps into converged depth maps as may serve a particular implementation. For example, data capture processing unit 310 may include one or more servers, desktop computers, or other computing devices that may leverage various types of hardware (e.g., central processing units ("CPUs"), field programmable gate arrays ("FPGAs"), general purpose graphics processing units ("GPGPUs"), etc.) and/or software to perform one or more of the operations described herein. In some examples, data capture processing unit 310 may be configured to perform parallel computing operations. For instance, data capture processing unit 310 may perform parallel computing operations by simultaneously employing multiple types of hardware (e.g., FPGAs and GPGPUs) to perform hardware-accelerated parallel computing, by coordinating multiple hardware instances (e.g., multiple GPGPUs on different desktop computers, etc.) to perform multiple-hardware parallel computing, by using a message passing interface ("MPI") to coordinate multiple computing nodes (e.g., each containing a plurality of GPGPUs or other hardware instances) to perform multiple-node parallel computing, and/or by any other method as may serve a particular implementation.

While data capture processing unit 310 may be configured to generate depth data by converging independently-captured depth maps into converged depth maps, it is also noted (as mentioned above) that depth map capture subsystems (e.g., included within nodes 302) may similarly include computing resources configured to generate depth data by converging independently-captured depth maps.

As such, in certain examples, the depth data represented within the converged depth maps may be generated in an integrated manner by a computing system such as data capture processing unit 310, while, in other examples, the depth data may be generated in a distributed manner by each node 302 before being transmitted to data capture processing unit 310. In yet other examples, depth data may be converged in a hierarchy of levels and/or by a plurality of computing devices including computing devices associated with each node 302 as well as computing devices associated with data capture processing unit 310. Specifically, system 100 may access (e.g., using data capture processing unit 310) a first depth map by converging (e.g., using one or more of nodes 302) a first plurality of antecedent depth maps into the first depth map, where the antecedent depth maps in the first plurality of antecedent depth maps are each captured by way of a first depth map capture technique at the one or more nodes 302. Similarly, system 100 may access (e.g., using data capture processing unit 310) a second depth map by converging (e.g., using the one or more nodes 302) a second plurality of antecedent depth maps into the second depth map, where the antecedent depth maps in the second plurality of antecedent depth maps are each captured by way of a second depth map capture technique (e.g., the same or a different depth map capture technique as the first depth map capture technique) at the one or more nodes 302.

As a more specific example, node 302-1 may be configured to generate depth data by converging independently-captured depth maps captured by depth map capture subsystems included within node 302-1 into a first converged depth map. Similarly, node 302-2 may be configured to generate depth data by converging independently-captured depth maps captured by depth map capture subsystems included within node 302-2 into a second converged depth map. Nodes 302-1 and 302-2 may transmit the respective generated depth data (i.e., the first and second converged depth maps, respectively) to data capture processing unit 310 (e.g., by way of connection 308). Data capture processing unit 310 may then access the first and second converged depth maps (e.g., by receiving the converged depth maps from nodes 302-1 and 302-2) and treat the first and second converged depth maps as antecedent depth maps for an additional converged depth map. Specifically, data capture processing unit 310 may generate additional depth data by converging the first and second converged depth maps (or at least the portions of them that overlap) into a third converged depth map.

By converging various parts of various depth maps from various nodes 302 in this way, system 100 may ultimately generate a depth map representative of many or all of the objects within real-world scene 304 from various angles surrounding the objects so that many or all of the surfaces of the objects are represented in a unified converged depth map, even if depth data for all of the objects and/or all of the surfaces would be impossible to capture from a single fixed node position.

After generating and/or otherwise processing the depth data representative of the surfaces of object 202 included in real-world scene 304, data capture processing unit 310 may use the depth data or provide the depth data for use by another system included within or otherwise associated with system 100 in any way as may serve a particular implementation. For example, based on the generated depth data (e.g., one or more converged depth maps, a unified converged depth map representative of the entirety of real-world scene 304, etc.), system 100 may generate a dynamic volumetric model of the surfaces of object 202 within real-world scene 304. A dynamic volumetric model of an object may include and/or be generated based both on 1) the depth data representing where and how the object is positioned in 3D space at a particular time, or with respect to time over a particular time period, and on 2) synchronous 2D video data (e.g., captured by system 100 or another system associated with system 100) mapped onto a positional model (e.g., a wireframe model of the object derived from the depth data) to represent how the object appeared at the particular time or with respect to time over the particular time period. As such, dynamic volumetric models may be 3D models including three spatial dimensions or four-dimensional ("4D") models that include the three spatial dimensions as well as a temporal dimension.

In some examples, system 100 may further generate a data stream (e.g., a real-time data stream) representative of the dynamic volumetric model of the surfaces of object 202 included in real-world scene 304. For example, data capture processing unit 310 may generate the data stream in real time such that users not physically located within or around real-world scene 304 may be able to experience real-world scene 304 live, in real time or near-real time, via virtual reality media content representative of real-world scene 304. Accordingly, the dynamic volumetric model of the surfaces of object 202 may be configured to be used to generate virtual reality media content representative of real-world scene 304. The virtual reality media content may be generated by system 100 (e.g., by data capture processing unit 310) and/or by another system associated with system 100 (e.g., another system operated by a virtual reality media provider or by a separate entity such as a virtual reality media content distributor associated with the virtual reality media provider). Virtual reality media content may be generated (e.g., based on a real-time data stream generated from a dynamic volumetric model of the surfaces of object 202 and/or other objects within real-world scene 304) by implementation 300 (e.g., nodes 302, data capture processing unit 310, etc.), and then distributed by way of a network 312 to one or more media player devices such as a media player device 314 associated with a user 316. It will be understood that in certain implementations network 312 and/or media player device 314 may be communicatively coupled to system 100 (e.g., to data capture processing unit 310), but may be separate from (i.e., not incorporated or included within) system 100.

System 100 may provide the virtual reality media content to media player device 314 so that user 316, who may not be physically located near real-world scene 304 but who may wish to experience real-world scene 304 (e.g., a real-world event occurring within real-world scene 304), may experience real-world scene 304 virtually using media player device 314. Additionally, it may be desirable for user 316 to experience real-world scene 304 live (e.g., in real time or near-real time as a real-world event is occurring). Accordingly, system 100 may provide the virtual reality media content representative of real-world scene 304 to media player device 314 in real time.

While data processing and data distribution may take a finite amount of time such that it may be impossible for a user to experience real-world scene 304 precisely as events within real-world scene 304 occur, as used herein, an operation (e.g., providing the virtual reality media content) is considered to be performed "in real time" when the operation is performed immediately and without undue delay. Accordingly, a user may be said to experience a real-world scene in real time even if the user experiences particular occurrences within the event (e.g., a particular shot in a basketball game) a few seconds or minutes after the occurrences actually take place. To support real-time dynamic volumetric modeling and experiencing of immersive virtual reality worlds based on live real-world scenes, system 100 or certain components of system 100 (e.g., data capture processing unit 310) may include or be implemented by powerful hardware resources (e.g., multiple servers including multiple processing units) that may be configured to perform the immense processing required for real-time creation and distribution of immersive virtual reality worlds based on real-time data streams representative of dynamic volumetric models of the surfaces of objects within real-world scenes.

It may be undesirable for user 316, who may experience real-world scene 304 virtually (e.g., using media player device 314 to present virtual reality media content provided by system 100), to be limited to one or more discrete positions within the immersive virtual reality world representative of real-world scene 304. As such, system 100 may provide the virtual reality media content representative of real-world scene 304 as experienced from a dynamically selectable viewpoint corresponding to an arbitrary location within real-world scene 304. The dynamically selectable viewpoint may be selected by user 316 while user 316 is experiencing real-world scene 304 using media player device 314.

As used herein, an "arbitrary location" may refer to any point in space at the real-world event. For example, arbitrary locations are not limited to fixed node positions (e.g., where nodes 302 are disposed) around real-world scene 304, but also include all the positions between nodes 302 and even positions where nodes such as nodes 302 may not be able to be positioned (e.g., in the middle of real-world scene 304). Moreover, arbitrary locations may not be limited to aligning with a viewing angle of any particular node 302. In some examples, such arbitrary locations (i.e., that do not directly align with a viewing angle of any node 302) may correspond to the most desirable viewpoints within real-world scene 304. For instance, if real-world scene 304 includes a basketball game, nodes 302 may not be allowed to be positioned in the middle of the basketball court because nodes 302 would interfere with gameplay of the basketball game.

However, user 316 may dynamically select viewpoints from which to experience the game that are in any arbitrary location on the basketball court. For example, the user may dynamically select his or her viewpoint to follow the basketball up and down the basketball court and experience the basketball game as if standing on the basketball court in the middle of the action of the game. In other words, for example, while nodes 302 may be positioned at fixed node positions surrounding the basketball court, but may not be positioned directly on the court so as not to interfere with gameplay of the basketball game, user 316 may dynamically select viewpoints from which to experience the game that are in any arbitrary location on the basketball court.

Network 312 may include any provider-specific wired or wireless network (e.g., a cable or satellite carrier network or a mobile telephone network), the Internet, wide area network, or any other suitable network. Data may flow between system 100 (e.g., by way of data capture processing unit 310) and media player device 314 (as well as other media player devices not explicitly shown) using any communication technologies, devices, media, and protocols as may serve a particular implementation. For example, data capture processing unit 310 may communicate with media player device 314 using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies. While only one network 312 is shown to interconnect data capture processing unit 310 and media player device 314 in FIG. 3, it will be recognized that data capture processing unit 310, media player device 314, and/or other subsystems of system 100 or systems associated with system 100 may intercommunicate by way of multiple interconnected networks as may serve a particular implementation.

Media player device 314 may be used by user 316 to access and experience virtual reality media content received from system 100 (e.g., from data capture processing unit 310). To this end, media player device 314 may include or be implemented by any device capable of presenting a field of view of an immersive virtual reality world (e.g., an immersive virtual reality world representative of real-world scene 304) and detecting user input from user 316 to dynamically update the immersive virtual reality world presented within the field of view as user 316 experiences the immersive virtual reality world. Exemplary immersive virtual reality worlds and fields of view will be illustrated and described in more detail below. Additionally, in certain implementations, media player device 314 may further be configured to present sensory data (e.g., 3D sensory data other than video and audio data presented in connection with the immersive virtual reality world) along with the field of view of the immersive virtual reality world. For example, media player device 314 may include, connect to, or otherwise be associated with sensory feedback devices such as sensory feedback gloves, sensory feedback body suits, and the like, which may present the sensory data to provide users with a sensation of feeling, touching, smelling, or otherwise perceiving particular objects or other elements of the immersive virtual reality world and thereby enhance users' experiences within the immersive virtual reality world. As such, in certain examples, system 100 (e.g., data capture processing unit 310 and/or other components of system 100) may receive, generate, process, transmit, and/or otherwise provide sensory data to media player device 314 to allow or facilitate enhanced sensory experiences for users within the immersive virtual reality world.

In some examples, media player device 314 may be configured to allow user 316 to select respective virtual reality media content programs (e.g., associated with different real-world scenes, as well as other types of virtual reality media content programs) that user 316 may wish to experience. In certain examples, media player device 314 may download virtual reality media content programs that user 316 may experience offline (e.g., without an active connection to data capture processing unit 310). In other examples, media player device 314 may request and receive data streams representative of virtual reality media content programs that user 316 experiences while media player device 314 remains in active communication with system 100 (e.g., data capture processing unit 310) by way of network 312.

Media player device 314 may take one of several different form factors. For example, media player device 314 may include or be implemented by a head-mounted virtual reality device (e.g., a virtual reality gaming device) that includes a head-mounted display screen, by a personal computer device (e.g., a desktop computer, laptop computer, etc.), by a mobile or wireless device (e.g., a smartphone, a tablet device, a mobile reader, etc.), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersion for user 316.

While, as mentioned above, it may be desirable in some examples for user 316 to experience real-world scene 304 in real time (e.g., as events occur within real-world scene 304 or after a trivial period of delay), in other examples, user 316 may wish to experience real-world scene 304 in a time-shifted manner, rather than in real time. To this end, system 100 may store and maintain, subsequent to providing virtual reality media content representative of real-world scene 304 in real time, a recording of the data stream representative of the dynamic volumetric model of the surfaces of the objects of real-world scene 304. Then, when user 316 later wishes to experience real-world scene 304, system 100 may provide virtual reality media content representative of real-world scene 304 as experienced from a dynamically selectable viewpoint corresponding to an arbitrary location within real-world scene 304 selected by the user. For example, system 100 may provide the virtual reality media content to media player device 314 based on the recording of the real-time data stream.

Figure 4:
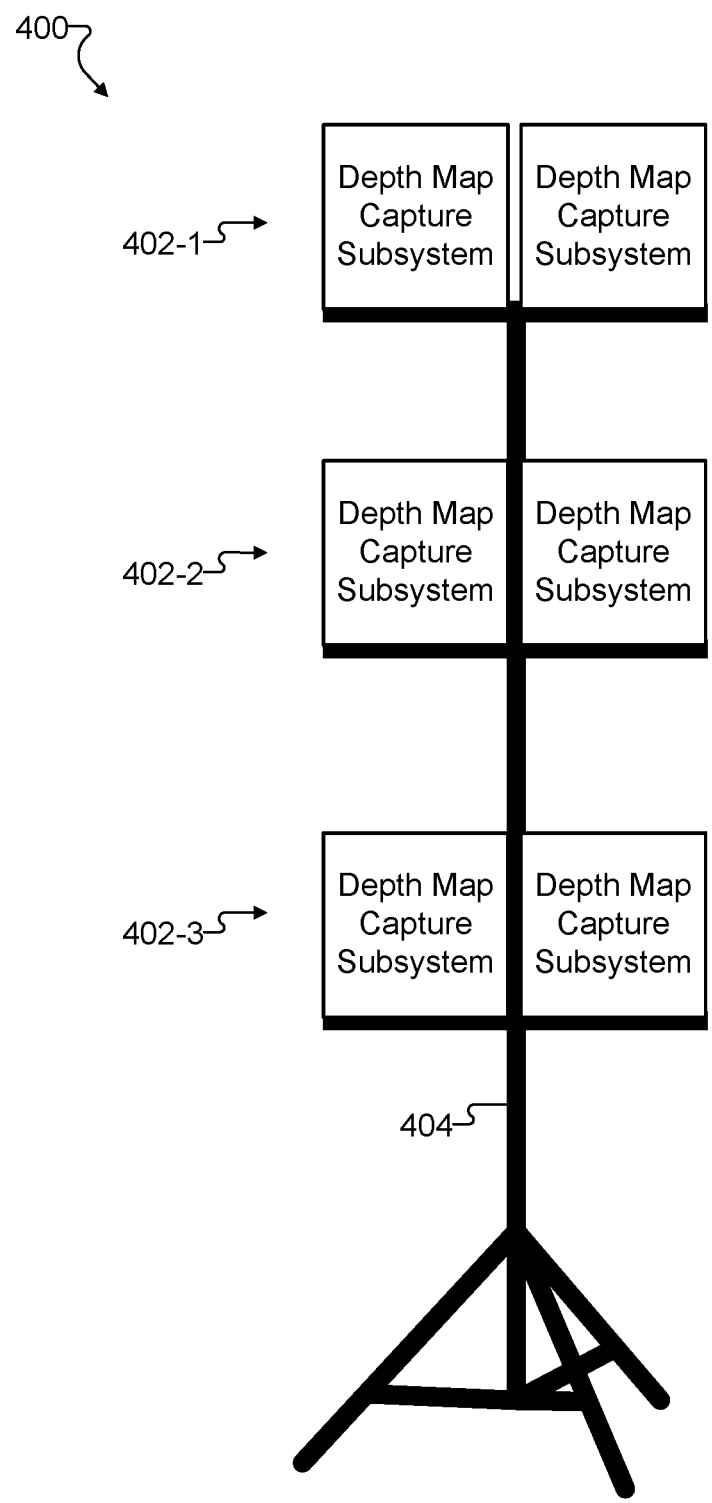
FIG. 4 illustrates an exemplary node of an exemplary implementation of the depth data generation system of FIG. 1 according to principles described herein.

To illustrate a node in which one or more depth map capture subsystems are used to independently capture one or more depth maps and/or to generate depth data by converging the independently-captured depth maps (i.e., a node similar or the same as one of nodes 302), FIG. 4 shows an exemplary node 400 of an exemplary implementation of system 100. Node 400 may include a plurality of camera rigs that each include a plurality of depth map capture subsystems. Specifically, as shown in FIG. 4, in certain implementations, node 400 may include three camera rigs 402 (i.e., camera rigs 402-1, 402-2, and 402-3), which may each include a respective plurality of depth map capture subsystems. Each of the depth map capture subsystems may include various hardware devices and/or other suitable equipment for performing a depth map capture technique and/or any other functionality as may be described herein or as may serve a particular implementation. As shown, camera rigs 402 may be supported and or positioned (e.g., in respective fixed positions) by node positioning structure 404, such as a tripod or the like.

Node positioning structure 404 may provide flexibility in how cameras and other devices are positioned by allowing camera rigs 402 to be adjusted to various heights, angles, etc., based on characteristics of a particular real-world scene being captured (e.g., characteristics of the types of objects within the real-world scene, etc.). For example, if a real-world scene includes human subjects in standing or sitting positions (e.g., such as a basketball game), node positioning structure 404 may allow one camera rig 402 to be positioned at a height of approximately eight feet (i.e., taller than most people) and angled to be aiming slightly downward to capture data related to the tops of the heads and shoulders of the human subjects. Similarly, node positioning structure 404 may also allow another camera rig 402 to be positioned at a height of approximately two feet and angled to be aiming slightly upward to capture data related to the bottoms of the chins of the human subjects, and so forth. These heights and angles are exemplary only. It will be understood that node positioning structure 404 may support camera rigs 402 being positioned in any suitable arrangement as may serve a particular implementation.

Node 400 may represent any node of system 100 as may serve a particular implementation. For example, any of nodes 302 illustrated in FIG. 3 may be set up with multiple camera rigs to resemble node 400 in certain implementations. Additionally, any or all of the other nodes described in various implementations described below may similarly resemble node 400 or a variant of node 400. For example, while node 400 is shown to include three camera rigs 402 each with two depth map capture subsystems, variants of node 400 may have any number of camera rigs each including any number or configuration of depth map capture subsystems or components thereof as may serve a particular implementation.

While node 400 may be located at a fixed node position with respect to the real-world scene such that a horizontal perspective of each camera rig 402 is aligned, camera rigs 402 are spaced apart along a vertical dimension such that each depth map capture subsystem (or set of depth map capture subsystems, as the case may be) may have a slightly different perspective (e.g., based on the distinct fixed positions of the components within each depth map capture subsystem) than other depth map capture subsystems (or sets of depth map capture subsystems). Thus, for example, a depth map capture subsystem of camera rig 402-1 may more accurately and/or effectively detect surfaces of objects that are higher off the ground (e.g., the tops of people's heads, etc.) than, for example, a depth map capture subsystem of camera rig 402-3, while the depth map capture subsystem of camera rig 402-3 may excel in accurately and effectively detecting surfaces of objects nearer to the ground.

Figure 5:
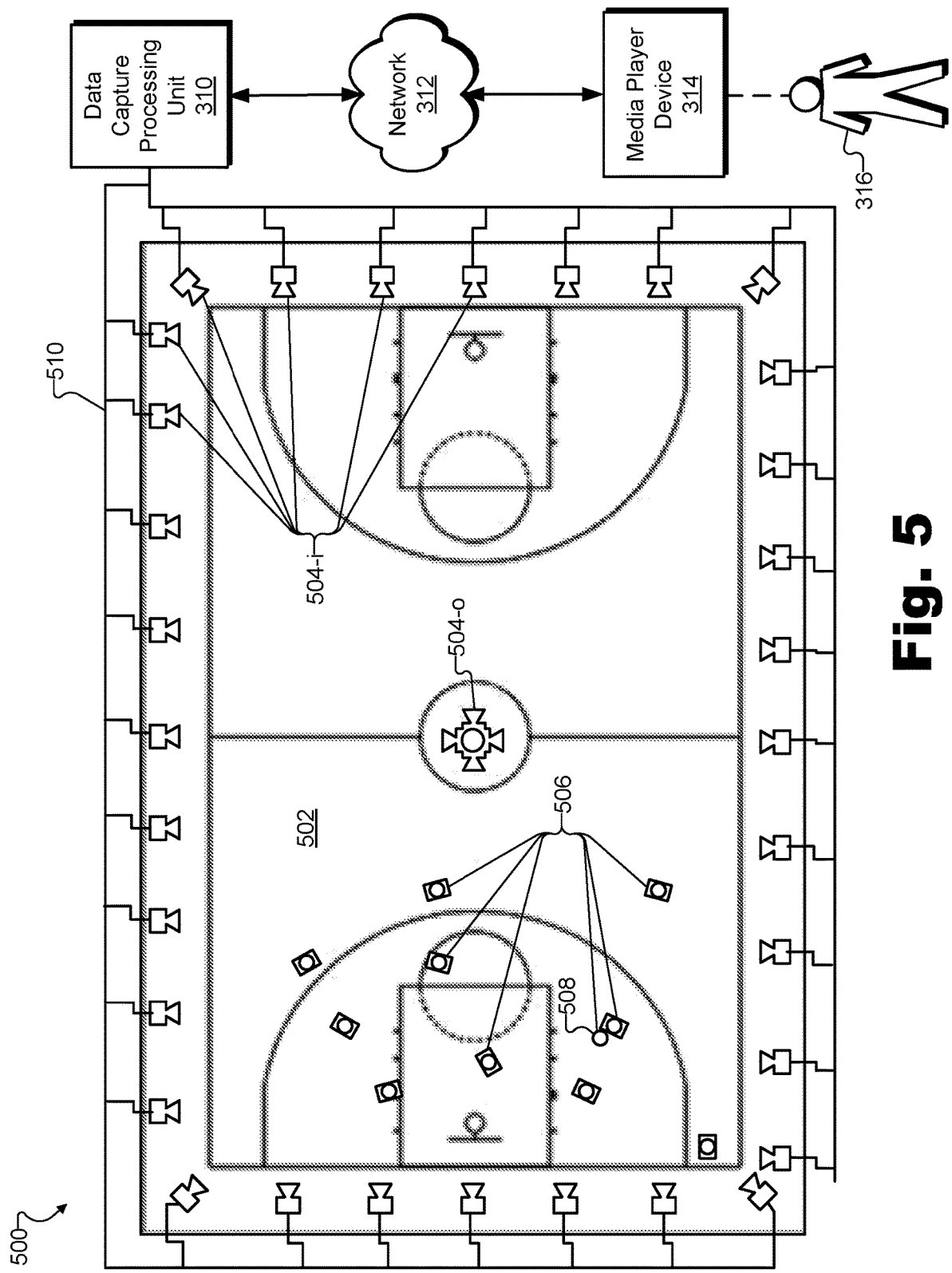
FIG. 5 illustrates another exemplary implementation of the depth data generation system of FIG. 1 positioned with respect to another exemplary real-world scene in order to generate depth data by converging independently-captured depth maps according to principles described herein.

As another example of how system 100 may operate and/or be used in a virtual reality application in order to generate and/or facilitate generation of a dynamic volumetric model of surfaces of objects in a real-world scene, FIG. 5 illustrates an exemplary implementation 500 of system 100 positioned with respect to an exemplary real-world scene 502 in order to generate depth data by converging independently-captured depth maps. As shown, real-world scene 502 in FIG. 5 includes or is associated with a real-world event of a basketball game (e.g., a live basketball game).

Similar to real-world scene 304 in FIG. 3, real-world scene 502 of FIG. 5 is shown to be surrounded by inward-facing synchronous nodes 504-$i$. Additionally, real-world scene 502 is shown to surround at least one outward-facing node 504-$o$. Nodes 504-$i$ and 504-$o$ may collectively be referred to herein as "nodes 504"). The fixed node positions at which nodes 504 are located illustrate an example where each node 504 may be associated with only a particular slice (i.e., a horizontal slice) of a real-world scene, rather than the entirety of the real-world scene, as was described above. Specifically, each node 504 may capture (e.g., along with neighboring nodes 504 and/or nodes 504 that are across the basketball court) only a particular section of real-world scene 502 based on the location and orientation of the fixed node position at which the node is disposed.

Nodes 504 may be configured to capture one or more depth maps (e.g., independently-captured depth maps) representative of surfaces of objects 506 included in real-world scene 502 (e.g., players, a basketball 508, etc.) by way of, for example, one or more depth map capture techniques. Accordingly, nodes 504 may be similar to nodes 302 in that each node 504 may include one or more depth map capture subsystems and/or additional components described to be associated with other nodes described herein (e.g., node 400) or as may serve a particular implementation.

Additionally, nodes 504 may also include features not explicitly described in relation to nodes 302 above. For example, nodes 504 may include video capture devices (e.g., visible light video cameras, etc.) configured to capture texture data (e.g., 2D video data) of objects 506 included in real-world scene 502 that, when combined with depth data representative of objects 506, may be used to generate dynamic volumetric models of the surfaces of objects 506 included in real-world scene 502. Also, as illustrated by node 504-$o$, one or more of nodes 504 may be outward-facing nodes that capture depth maps for one or more objects surrounding real-world scene 502. For example, node 504-$o$ may facilitate capturing depth data and/or texture data representative of objects in the spectator seating areas at the venue in which the basketball game is taking place. Because node 504-$o$ may not be able to be positioned directly on the basketball court (i.e., because it would interfere with the basketball game), node 504-$o$ may be suspended above real-world scene 502 or otherwise positioned as may serve a particular implementation.

Objects 506 may include any objects associated with (e.g., located in or around) real-world scene 502. For example, objects 506 may include people on the court (e.g., basketball players, referees, and other people on the basketball court), basketball 508, and/or other living and/or inanimate objects such as basketball standards (i.e., backboards, rims, nets, etc.), the floor of the basketball court, people and/or objects on the sidelines of the basketball game, spectators and seating areas surrounding the basketball court, and the like.

As shown, nodes 504 may be communicatively coupled by connections 510 (e.g., including wired or wireless connections such as described above in relation to connection 308) to one another and/or to data capture processing unit 310, which was described above in relation to FIG. 3. As also described above, data capture processing unit 310 may be communicatively coupled by network 312 to media player device 314, which is associated with user 316. Based on depth data generated by data capture processing unit 310, system 100 (e.g., data capture processing unit 310 or another component of system 100) may generate a data stream (e.g., a real-time data stream) representative of a dynamic volumetric model of the surfaces of objects 506 included in real-world scene 502. Data capture processing unit 310 may further generate virtual reality media content representative of real-world scene 502 (e.g., based on the data stream) and provide the virtual reality media content to media player device 314 to be experienced by user 316, as described above.

Figure 6:
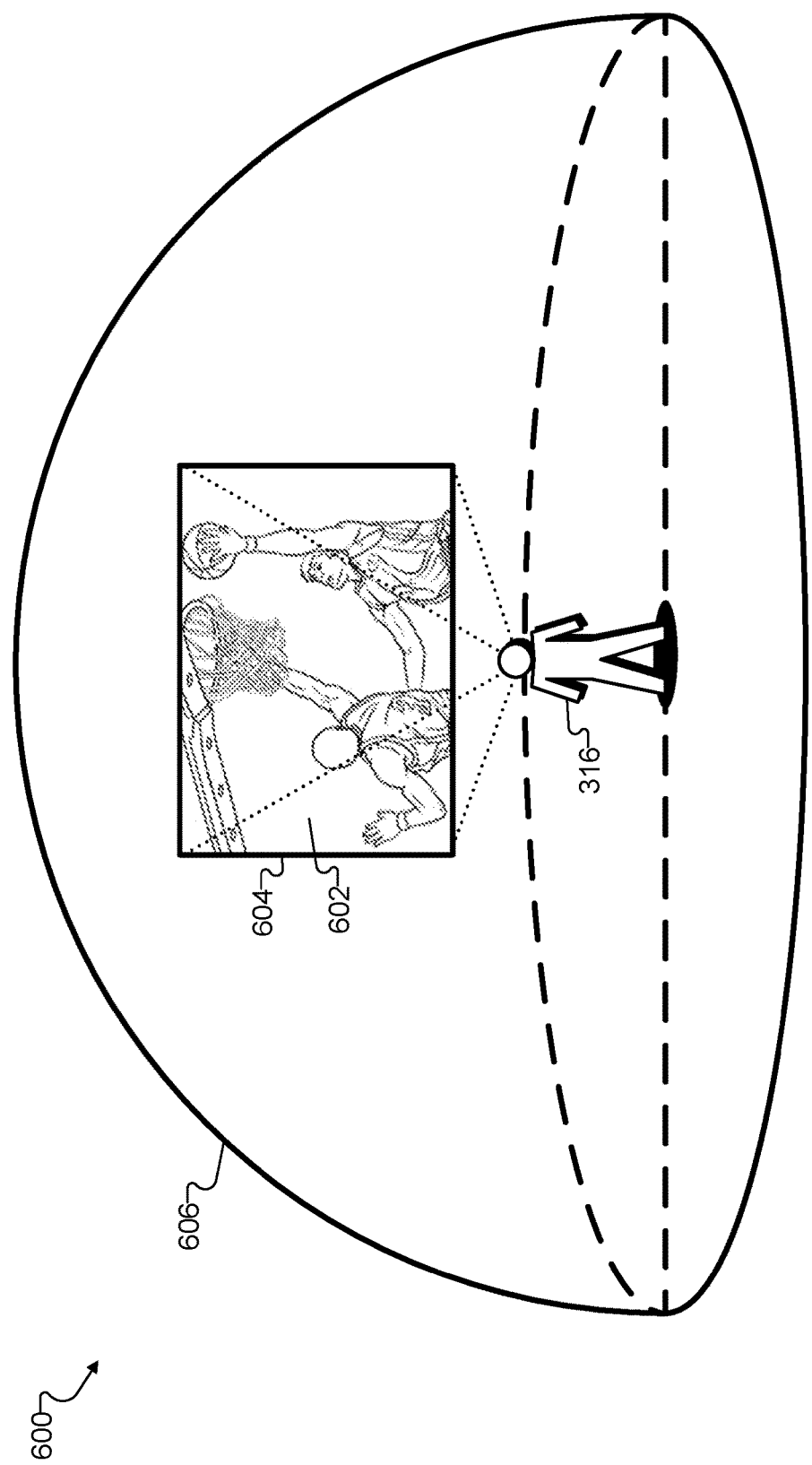
FIG. 6 illustrates an exemplary virtual reality experience in which a user is presented with exemplary virtual reality media content representative of a real-world scene as experienced from a dynamically selectable viewpoint corresponding to an exemplary arbitrary location within the real-world scene according to principles described herein.

To illustrate, FIG. 6 shows an exemplary virtual reality experience 600 in which user 316 is presented with exemplary virtual reality media content representative of real-world scene 502 as experienced from a dynamically selectable viewpoint corresponding to an exemplary arbitrary location within real-world scene 502. Specifically, virtual reality media content 602 is presented within a field of view 604 that shows real-world scene 502 from a viewpoint corresponding to an arbitrary location right underneath a basketball standard within real-world scene 502 where a shot is being made. An immersive virtual reality world 606 based on the real-world event may be available for the viewer to experience by providing user input (e.g., head movements, keyboard input, etc.) to look around and/or to move around (i.e., dynamically select a viewpoint from which to experience) immersive virtual reality world 606.

For example, field of view 604 may provide a window through which user 316 may easily and naturally look around immersive virtual reality world 606. Field of view 604 may be presented by media player device 314 (e.g., on a display screen of media player device 314) and may include video depicting objects surrounding the user within immersive virtual reality world 606. Additionally, field of view 604 may dynamically change in response to user input provided by the user as the user experiences the immersive virtual reality world. For example, the media player device may detect user input (e.g., moving or turning the display screen upon which the field of view is presented). In response, the field of view may display different objects and/or objects seen from a different viewpoint (e.g., a viewpoint corresponding to the position of the display screen) in place of the objects seen from the previous viewpoint.

In FIG. 6, immersive virtual reality world 606 is illustrated as a semi-sphere, indicating that user 316 may look in any direction within immersive virtual reality world 606 that is substantially forward, backward, left, right, and/or up from the viewpoint of the location under the basketball standard that user 316 has currently selected. In other examples, immersive virtual reality world 606 may include an entire 360° by 180° sphere such that user 316 may also look down. Additionally, user 316 may move around to other locations within immersive virtual reality world 606 (i.e., dynamically selecting different dynamically selectable viewpoints of the real-world event). For example, user 316 may select a viewpoint at half court, a viewpoint from the free-throw line facing the basketball standard, a viewpoint suspended above the basketball standard, or the like.

As described above, system 100 may include one or more depth map capture subsystems each configured to independently capture depth maps that may be converged to form converged depth maps (e.g., converged depth maps that are more accurate or otherwise superior to the depth maps captured by the depth map capture subsystems). As further mentioned above, each depth map capture subsystem may capture a respective depth map from a particular fixed position with respect to a real-world scene at which the depth map capture subsystem is disposed, based on a depth map capture technique.

FIGS. 7A-7C show three exemplary depth map capture techniques that may be implemented by one or more depth map capture subsystems within system 100. Specifically, FIG. 7A illustrates a depth map capture technique 700-A representing an exemplary structured light depth map capture technique, FIG. 7B illustrates a depth map capture technique 700-B representing an exemplary stereoscopic depth map capture technique, and FIG. 7C illustrates a depth map capture technique 700-C representing an exemplary time-of-flight depth map capture technique. Collectively, depth map capture techniques 700-A, 700-B, 700-C, and other depth map capture techniques described herein or that may be used to serve particular implementations are referred to herein as depth map capture techniques 700.

In some examples, related depth map capture subsystems (e.g., depth map capture subsystems within the same camera rig, depth map capture subsystems within the same node, depth map capture subsystems at the same relative position on different camera rigs or different nodes, etc.) may perform depth map capture techniques that are complementary to one another. As used herein, "complementary" depth map capture techniques may refer to depth map capture techniques that each have one or more strengths that align, to at least some degree, with one or more weaknesses of the other depth map capture technique. For example, as will be described in more detail below, a first depth map capture technique 700 (e.g., depth map capture technique 700-A) may be adapted to detect depth data representative of a first type of surface of an object relatively effectively, while being relatively ineffective at detecting depth data representative of a second type of surface. Conversely, a second depth map capture technique 700 (e.g., depth map capture technique 700-B) may be adapted to detect depth data representative of the second type of surface relatively effectively, while being relatively ineffective at detecting depth data representative of the first type of surface. Accordingly, the first and second depth map capture techniques may be complementary depth map capture techniques. It will be understood that each of depth map capture techniques 700 may be complementary with every other depth map capture technique 700, as well as to other depth map capture techniques not explicitly illustrated in FIGS. 7A-7C (e.g., such as an infrared stereo-disparity depth map capture technique described below).

In certain examples, system 100 may converge (e.g., using confidence values assigned and analyzed to ensure that the most effectively-captured depth data is relied on to the greatest extent, as described in more detail below) depth maps captured using complementary depth map capture techniques in order to take advantage of respective strengths of the complementary depth map capture techniques while avoiding respective weaknesses of the depth map capture techniques. In the same or other examples, system 100 may also converge (e.g., also using the confidence values) depth maps captured from different fixed positions with respect to the real-world scene (e.g., so as to have different vantage points with which to detect depth data representative of various surfaces of objects within the real-world scene) in order to similarly take advantage of respective strengths of each vantage point while avoiding respective weaknesses of the vantage point.

Depth map capture techniques 700 may be performed by depth map capture subsystems in any suitable way and/or using any configuration as may serve a particular implementation. For example, referring to FIG. 4, each depth map capture subsystem on a particular camera rig 402 (e.g., the two depth map capture subsystems on camera rig 402-1, for example) may perform a different depth map capture technique 700. More specifically, for instance, one depth map capture subsystem on camera rig 402-1 may perform structured light depth map capture technique 700-A while the other depth map capture subsystem on camera rig 402-1 may perform stereoscopic depth map capture technique 700-B.

In some examples, each camera rig within a node (e.g., all three camera rigs 402 in node 400) may perform the same depth map capture techniques. In other examples, different camera rigs within a node may perform different depth map capture techniques. For example, referring to the example above where the depth map capture subsystems of camera rig 402-1 perform depth map capture techniques 700-A and 700-B, the depth map capture subsystems of another camera rig within node 400 (e.g., camera rig 402-2) may perform the same depth map capture techniques (e.g., depth map capture techniques 700-A and 700-B) or different depth map capture techniques (e.g., depth map capture techniques 700-A and 700-C, 700-B and 700-C, etc.). Similarly, just as various configurations of depth map capture techniques may be employed on a given camera rig, any suitable combination or configuration of depth map capture techniques may also be employed on a given node (e.g., such as nodes 302 of FIG. 3, nodes 504 of FIG. 5, etc.) as may serve a particular implementation.

Depth map capture technique 700-A and variants of depth map capture technique 700-A may be referred to herein as structured light depth map capture techniques. Structured light depth map capture technique 700-A is illustrated in FIG. 7A by a top view of various elements of a depth map capture subsystem along with object 202, which was described above. Specifically, as shown, the depth map capture subsystem performing structured light depth map capture technique 700-A may include a structured light emitter 702 disposed at a first fixed position with respect to the real-world scene and configured to emit a structured light pattern onto the surfaces of the objects included in the real-world scene (e.g., object 202). The depth map capture subsystem performing structured light depth map capture technique 700-A may also include a structured light sensor 704 disposed at a second fixed position with respect to the real-world scene and configured to detect the structured light pattern as the structured light pattern reflects off of the surfaces of the objects included in the real-world scene. While structured light emitter 702 and structured light sensor 704 are illustrated in FIG. 7A as slightly converging (e.g., pointing inward toward one another), it will be understood that in certain implementations, structured light emitter 702 and structured light sensor 704 may be oriented at any suitable angle with respect to one another and/or with respect to the real-world scene. For example, structured light emitter 702 and structured light sensor 704 may be oriented parallel to one another (i.e., both pointing straight ahead rather than pointing inward) or even oriented to be pointing somewhat outward from one another as may serve a particular implementation.

The depth map capture subsystem performing structured light depth map capture technique 700-A may capture a depth map by generating the depth map based on the detected structured light pattern and the first and second fixed positions. For example, due to the shape of object 202, the structured light pattern emitted by structured light emitter 702 may follow a curvature of the surfaces of object 202 and may appear, from the fixed position of structured light sensor 704 with respect to object 202, to bend and contour to the surfaces of object 202. As such, the depth map capture subsystem may determine depth data representative of the surfaces of object 202 by triangulating particular physical points on surfaces of object 202 based on known angles and fixed positions of both structured light emitter 702 and structured light sensor 704, and based on how particular light associated with the structured light pattern reflects from the particular physical points on the surfaces of object 202.

Structured light depth map capture technique 700-A may be used to effectively capture depth data for surfaces that are smooth and relatively featureless (e.g., certain types of walls, ceilings, or floors, objects having smooth surfaces such as object 202, etc). Additionally, structured light depth map capture technique 700-A may be used to effectively capture depth data for surfaces of objects that are relatively near to or far away from structured light emitter 702 and/or structured light sensor 704. However, structured light depth map capture technique 700-A may be less effective when used to capture depth data from surfaces that absorb light at the frequency that the structured light pattern is emitted since the structured light pattern may not be effectively reflected to be detected by structured light sensor 704. Additionally, structured light depth map capture technique 700-A may be most effective within certain areas of a structured light pattern (e.g., areas near the middle of the structured light pattern) while being less effective at other areas (e.g., near the edges of the structured light pattern).

Structured light emitter 702 may include any suitable hardware or combination of hardware and software configured to emit a structured light pattern onto the surfaces of object 202. For example, structured light emitter 702 may include or be implemented by any of the components described above in relation to depth map capture subsystem 204 or depth map access facility 102 of system 100. In certain implementations, structured light emitter 702 may include a device configured to generate stimulated emission of electromagnetic radiation (e.g., a visible light laser or equivalent IR device or other device associated with another part of the electromagnetic spectrum) to emit a light beam 706 that may be processed, split, shaped, filtered, or otherwise treated by an optical element 708. For example, optical element optical element 708 may include or be implemented by one or more lenses, mirrors, filters, splitters, combiners, prisms, or other diffractive optical elements, or a series thereof, that may be configured to split and/or shape light beam 706 into a structured light pattern that is emitted (i.e., projected, shined, etc.) onto object 202 and/or other objects in the vicinity of object 202 within a real-world scene (not explicitly shown).

Optical element 708 may split, shape, or otherwise alter light beam 706 to form the structured light pattern in any way as may serve a particular implementation. In certain examples, optical element may be optional and structured light emitter 702 may emit the structured light pattern without using light beam 706 and/or optical element 708.

The structured light pattern emitted by structured light emitter 702 may include or be implemented by any suitable pattern of light (e.g., IR light, visible light, etc.), as may be emitted by structured light emitter 702. Arrows shown to be emanating from structured light emitter 702 in FIG. 7A represent the structured light pattern by illustrating, from the top view, a sector (e.g., a sector of the real-world scene) that may be illuminated by the structured light pattern based on the position, projection angle, and other characteristics of structured light emitter 702. The pattern of the structured light is not shown in FIG. 7A due to the geometry of the top view, but it will be understood that the structured light pattern is projected onto the surfaces of object 202.

The structured light pattern may be patterned in any suitable way, such as, for example, with a pattern of dots that are uniformly sized and/or uniformly distributed, a pattern of dots with varied sizes and/or varied distribution patterns to facilitate identification of particular dots within the structured light pattern, a pattern of dots with random sizes and random distribution across the surfaces of the objects in the real-world scene, a pattern of stripes (e.g., horizontal, vertical, or diagonal stripes with uniform, varied, or random stripe widths and/or distributions), a checkered pattern, and/or any other suitable pattern of structured light. In certain examples where multiple structured light patterns overlap on the surface of an object, different patterns (e.g., complementary patterns that facilitate depth capture of different surfaces or different features of the surfaces) may be used.

When light included within the structured light pattern reaches the surfaces of the objects in the real-world scene (e.g., such as object 202), the light may reflect from the surfaces and travel back toward structured light emitter 702 and structured light sensor 704. As such, FIG. 7A shows arrows pointing toward structured light sensor 704 to illustrate a structured light pattern reflection originating from (i.e., reflecting off of) object 202 (e.g., and/or other objects within the real-world scene not explicitly shown).

Structured light sensor 704 may include any suitable hardware or combination of hardware and software configured to detect (e.g., sense, receive, record, etc.) a structured light pattern reflecting from the surfaces of object 202. For example, structured light sensor 704 may include or be implemented by any of the components described above in relation to depth map capture subsystem 204 or depth map convergence facility 104 of system 100 as well as other components (e.g., optics, filters, etc.) as may serve a particular implementation.

Structured light sensor 704 may be sensitive to light at a particular range of frequencies including a frequency or range of frequencies at which the structured light pattern is emitted by structured light emitter 702. For example, structured light sensor 704 may include or be implemented by a video camera that is sensitive to light at frequencies within the range of visible light. As another example, structured light sensor 704 may include or be implemented by an IR sensor that is sensitive to light in an IR portion of the electromagnetic spectrum. For example, the IR sensor may be sensitive to all or virtually all frequencies in an IR portion of the electromagnetic spectrum, frequencies in a "near IR" portion of the electromagnetic spectrum, IR frequencies associated with wavelengths from approximately 600 nanometers ("nm") to approximately 1000 nm, IR frequencies associated with wavelengths from approximately 700 nm to approximately 950 nm, IR frequencies associated with wavelengths from approximately 750 nm to approximately 875 nm, or any other frequency range as may serve a particular implementation.

Depth map capture technique 700-B and variants of depth map capture technique 700-B may be referred to herein as stereoscopic depth map capture techniques. As with structured light depth map capture technique 700-A, stereoscopic depth map capture technique 700-B is illustrated in FIG. 7B by a top view of various elements of a depth map capture subsystem along with object 202. Specifically, as shown, the depth map capture subsystem performing stereoscopic depth map capture technique 700-B may include a first optical sensor 710-1 disposed at a first fixed position with respect to the real-world scene and configured to detect the surfaces of the objects included in the real-world scene (e.g., object 202) from the first fixed position. The depth map capture subsystem performing stereoscopic depth map capture technique 700-B may also include a second optical sensor 710-2 disposed at a second fixed position (e.g., a fixed position offset from the first fixed position by a predetermined distance) with respect to the real-world scene and similarly configured to detect the surfaces of the objects included in the real-world scene from the second fixed position. While optical sensors 710-1 and 710-2 are illustrated in FIG. 7B as slightly converging (e.g., pointing inward toward one another), it will be understood that in certain implementations, optical sensors 710 may be oriented at any suitable angle with respect to one another and/or with respect to the real-world scene. For example, optical sensors 710 may be oriented parallel to one another (i.e., both pointing straight ahead rather than pointing inward) or even oriented to be pointing somewhat outward from one another as may serve a particular implementation.

The depth map capture subsystem performing stereoscopic depth map capture technique 700-B may capture a depth map by generating the depth map based on stereoscopic differences in how the surfaces of the objects are detected from the first and second fixed positions. For example, based on stereoscopic differences in how particular physical points on surfaces of object 202 appear from the first fixed position and how the particular physical points appear from the second fixed position, the depth map capture subsystem may triangulate the particular physical points in space based on known angles and fixed positions of both optical sensors 710 (i.e., first optical sensor 710-1 and second optical sensor 710-2) to determine depth data for the particular physical points.

Stereoscopic depth map capture technique 700-B may be used to effectively capture depth data for textured surfaces or surfaces of objects that include lots of edges, corners, and other easily identifiable features. Additionally, stereoscopic depth map capture technique 700-B may be used to effectively capture depth data for surfaces that may absorb light at various specific frequencies (e.g., specific frequencies at which a structured light pattern may be emitted) since the surfaces also likely reflect light at other frequencies that may be detected by optical sensors 710. However, stereoscopic depth map capture technique 700-B may be less effective at detecting depth data for surfaces that are smooth and relatively featureless or for surfaces of objects that are relatively far away from optical sensors 710. Additionally, stereoscopic depth map capture technique 700-B may be less effective at detecting depth data for surfaces of objects that are not naturally well lit by ambient light (e.g., surfaces that are in shadows or other dark areas, etc.).

As mentioned above, because structured light depth map capture technique 700-A is effective at capturing depth data for surfaces that stereoscopic depth map capture technique 700-B is not (e.g., smooth surfaces, far away surfaces, poorly-lit surfaces, etc.) and stereoscopic depth map capture technique 700-B is effective at capturing depth data for surfaces that structured light depth map capture technique 700-A is not (e.g., surfaces that absorb particular frequencies at which a structured light pattern is emitted, close-by surfaces that are illuminated by an edge of a structured light pattern, etc.), depth map capture techniques 700-A and 700-B may be complementary depth map capture techniques.

Optical sensors 710 may include any suitable hardware or combination of hardware and software configured to detect (e.g., sense, receive, record, etc.) light reflecting from the surfaces of object 202. For example, ambient light present within the real-world scene may reflect from the surfaces of the objects in the real-world scene (e.g., such as object 202) and travel toward optical sensors 710 at their respective fixed positions. As such, FIG. 7B shows arrows pointing toward each respective optical sensor 710 to illustrate light (e.g., ambient light) reflecting from object 202 (e.g., and/or other objects within the real-world scene not explicitly shown).

Optical sensors 710 may include or be implemented by any of the components described above in relation to depth map capture subsystem 204 or depth map convergence facility 104 of system 100 as well as other components (e.g., optics, filters, etc.) as may serve a particular implementation. For example, optical sensors 710 may be implemented by video cameras that are sensitive to visible light and/or light at other frequencies on the electromagnetic spectrum. In some examples, optical sensors 710 may be similar to or equivalent to structured light sensor 704.

Depth map capture technique 700-C and variants of depth map capture technique 700-C may be referred to herein as time-of-flight depth map capture techniques. As with depth map capture techniques 700-A and 700-B, time-of-flight depth map capture technique 700-C is illustrated in FIG. 7C by a top view of various elements of a depth map capture subsystem along with object 202. Specifically, as shown, the depth map capture subsystem performing time-of-flight depth map capture technique 700-C may include a light pulse source 712 configured to emit a light pulse at a particular time and a time-of-flight sensor 714 configured to detect, at a plurality of different times subsequent to the particular time, the emitted light pulse as the emitted light pulse reflects off of the surfaces of the objects included in the real-world scene (e.g., including object 202) in accordance with the respective depths of the surfaces of the objects. While light pulse source 712 and time-of-flight sensor 714 are illustrated in FIG. 7C as being positioned directly on top of one another (e.g., pointing in a parallel direction), it will be understood that in certain implementations, light pulse source 712 and time-of-flight sensor 714 may be oriented at any suitable angle with respect to one another and/or with respect to the real-world scene. For example, light pulse source 712 and time-of-flight sensor 714 may be oriented to be pointing inward toward one another or outward away from one another as may serve a particular implementation.

The depth map capture subsystem performing time-of-flight depth map capture technique 700-C may capture a depth map by generating the depth map based on the different times within the plurality of different times subsequent to the particular time at which the emitted light pulse is detected. For example, as illustrated by the time graph shown under the illustration of depth map capture technique 700-C in FIG. 7C, a light pulse configured to bathe the real-world scene in light (i.e., to reflect off all the surfaces of the objects visible from the perspective of light pulse source 712 like a camera flash) may be emitted at a particular time 716 that represents a singular moment in time or a relatively short period of time. Because light from the emitted light pulse travels from light pulse source 712 to the surfaces of the objects within the real-world scene (e.g., the surfaces of object 202) and then, after being reflected from the surfaces, travels back to be detected at time-of-flight sensor 714 with a constant and predictable speed, different arrival times 718 of light reflecting from different physical points on the surfaces of the objects may indicate the respective depths of the different physical points on the surfaces. Accordingly, by tracking and correlating precise arrival times 718 of light reflecting back from the surfaces of object 202, for example, the depth map capture subsystem may determine depth data representative of the surfaces of object 202.

Time-of-flight depth map capture technique 700-C may have certain characteristics in common with both structured light depth map capture technique 700-A (e.g., it may rely on projected light rather than ambient light, etc.) and stereoscopic depth map capture technique 700-B (e.g., it may detect multi-frequency light that bathes a real-world scene rather than light emitted at a particular frequency only to particular areas of the real-world scene according to a pattern, etc.). As such, time-of-flight depth map capture technique 700-C may be used to effectively capture depth data for certain types of surfaces while being less effective with other types of surfaces in accordance with these and/or other characteristics as described above in relation to depth map capture techniques 700-A and 700-B. Time-of-flight depth map capture technique 700-C may thus be complementary in at least certain respects with both structured light depth map capture technique 700-A and stereoscopic depth map capture technique 700-B.

Light pulse source 712 and time-of-flight sensor 714 may each include any suitable hardware or combination of hardware and software configured to emit a light pulse and/or detect (e.g., sense, receive, record, etc.) light reflecting from the surfaces of object 202. For example, light pulse source 712 may emit light at a particular frequency that is not present or prevalent in ambient light present at the real-world scene and time-of-flight sensor 714 may detect light at the particular frequency (i.e., so as to distinguish light from an emitted light pulse from other ambient light present at the real-world scene). In some examples, light pulse source 712 and time-of-flight sensor 714 may be integrated into a single device or may be included within separate devices as may serve a particular implementation. As shown, fixed positions of light pulse source 712 and of time-of-flight sensor 714 with respect to the real-world scene may be related (e.g., closely aligned so as to be equivalent for the purposes of time-of-flight depth map capture technique 700-C). As such, FIG. 7C shows arrows pointing away from light pulse source 712 to illustrate the light pulse bathing a sector of the real-world scene in light from the fixed position of light pulse source 712 and arrows pointing toward time-of-flight sensor 714 to illustrate light from the emitted light pulse reflecting from the surfaces of object 202 (e.g., and/or other surfaces of other objects within the real-world scene not explicitly shown) to be detected at time-of-flight sensor 714.

It will be understood that depth map capture techniques 700-A through 700-C illustrated in FIGS. 7A-7C are exemplary only and that variations of depth map capture techniques 700-A through 700-C and/or additional depth map capture techniques not explicitly illustrated may also be used to independently capture depth maps in certain implementations. For example, a stereo-disparity depth map capture technique (e.g., an infrared stereo-disparity depth map capture technique) may be employed in certain implementations. A stereo-disparity depth map capture technique may be understood to be a variant of either or both of structured light depth map capture technique 700-A and stereoscopic depth map capture technique 700-B, and may share certain characteristics with both of these depth map capture techniques.

Specifically, similar to structured light depth map capture technique 700-A, the stereo-disparity depth map capture technique may project structured light of a particular frequency (e.g., an infrared frequency) onto a real-world scene using a diffractive optical element such as those described herein. For example, the structured light pattern may include a field of random dots. Then, similar to stereoscopic depth map capture technique 700-B, the infrared stereo-disparity depth map capture technique may include optical sensors (e.g., monochrome cameras and/or any other optical sensor described herein) arranged in a stereo pair arrangement similar to optical sensors 710-1 in depth map capture technique 700-B, but with infrared bandpass filters that eliminate visible scene illumination. In this way, data detected by the optical sensors may be processed to generate a depth map based on the projected structured light pattern and calculated based on stereo-disparity algorithms such as those described above with respect to depth map capture technique 700-B. Accordingly, for example, the stereo-disparity depth map capture technique may include an structured light emitter (e.g., an infrared structured light emitter) with an associated diffractive optical element, two monochrome cameras, and a color camera (e.g., having similar resolution to the monochrome cameras) to be used in detecting full color textures of objects within the real-world scene.

Various implementations of depth map capture subsystems included within system 100 have been described and illustrated. For example, various principles of depth data capture and depth map capture subsystems were described in relation to FIG. 2A, various aspects of the positioning of depth map capture subsystems with respect to a real-world scene (e.g., via nodes, camera rigs, etc.) were described in relation to FIGS. 3 through 5, and various depth map capture techniques used for capturing independent depth maps were described in relation to FIGS. 7A-7C. Once a plurality of depth map capture subsystems (e.g., included within or communicatively coupled to system 100) have been configured to perform appropriate depth map capture techniques and have been appropriately disposed at fixed positions with respect to a real-world scene in accordance with the principles described above, the depth map capture subsystems may independently capture depth maps to be converged by system 100 into a converged depth map of the surfaces of the objects included in the real-world scene. To illustrate, various aspects of the capturing and converging of independently-captured depth maps will now be described in relation to FIGS. 8A-8C and 9.

FIG. 8A illustrates exemplary components of an exemplary implementation 800 of system 100 generating depth data by converging independently-captured depth maps. More specifically, implementation 800 shows two depth map capture subsystems 802 (i.e., depth map capture subsystems 802-1 and 802-2) each associated with a respective scope of capture 804 (i.e., scope of capture 804-1 associated with depth map capture subsystem 802-1 and scope of capture 804-2 associated with depth map capture subsystem 802-2) that includes object 202. Depth map capture subsystems 802 may be similar or the same as other depth map capture subsystems described herein and each respective scope of capture 804 may include, along with object 202, other objects within a real-world scene or a portion of a real-world scene as may serve a particular implementation.

Although not explicitly shown in FIG. 8A for clarity, it will be understood that implementation 800 of system 100 may further include additional or fewer components such as those described with respect to other implementations of system 100 described herein. For example, as mentioned above, implementation 800 may include one or more additional depth map capture subsystems positioned at additional fixed positions with respect to the real-world scene (e.g., at positions within different camera rigs of a same node, at positions within different nodes at different fixed node positions, etc.). Moreover, implementation 800 may include computing resources (e.g., servers or other computing devices included in or implementing a data capture processing unit such as data capture processing unit 310), and/or any other components described herein or as may serve a particular implementation. Similarly, while implementation 800 is shown to include depth map capture subsystems 802 and to access depth maps by capturing the depth maps, it will be understood that, in some examples, implementation 800 of system 100 may not include depth map capture subsystems 802 but, rather, may include only a computing system configured to access independently-captured depth maps by receiving the depth maps from depth map capture subsystems 802 as depth map capture subsystems 802 capture the depth maps.

As described above, depth maps captured by each of depth map capture subsystems 802 may be independent. As a first example, implementation 800 may include a plurality of nodes each disposed at a different fixed node position in a plurality of fixed node positions with respect to the real-world scene and each depth map capture subsystem 802 may capture a depth map from a different node in the plurality of nodes. In this example, the depth maps may be independently captured even if both depth map capture subsystems 802 capture the respective depth maps using the same depth map capture technique. For example, both depth map capture subsystems may capture the respective depth map using a structured light depth map capture technique, a stereoscopic depth map capture technique, a time-of-flight depth map capture technique, or any other depth map capture technique as may serve a particular implementation.

As a second example, each depth map capture subsystem 802 may capture a respective depth map by way of a different depth map capture technique. For example, depth map capture subsystem 802-1 may capture a first depth map by way of a first depth map capture technique selected from the structured light depth map capture technique, the stereoscopic depth map capture technique, the time-of-flight depth map capture technique, and other depth map capture techniques that may serve a particular implementation, while depth map capture subsystem 802-2 may capture a second depth map by way of a second, different depth map capture technique selected from the same list of depth map capture techniques. The first and second depth maps may be independently captured even if, for example, implementation 800 includes a plurality of nodes each disposed at a different fixed node position in a plurality of fixed node positions with respect to the real-world scene and the capturing of the first depth map and the capturing of the second depth map are both performed from a same particular node (e.g., and/or a same particular camera rig within the particular node) in the plurality of nodes.

Once independently-captured depth maps have been captured and/or otherwise accessed by system 100 (e.g., by being captured by depth map capture subsystems 802), system 100 may perform certain operations to converge the independently-captured depth maps into a converged depth map. For example, system 100 may assign respective confidence values to each depth data point in a first plurality of depth data points of the first depth map (i.e., the depth map captured by depth map capture subsystem 802-1) and assign other respective confidence values to each depth data point in a second plurality of depth data points of the second depth map (i.e., the depth map captured by depth map capture subsystem 802-2).

As illustrated in FIGS. 8B and 8C respectively, perspective views 806-1 and 806-2 of object 202 (i.e., collectively referred to herein as perspective views 806) illustrate object 202 from the perspective of each respective depth map capture subsystem 802 (i.e., view 806-1 illustrating object 202 from the perspective of depth map capture subsystem 802-1 and view 806-2 illustrating object 202 from the perspective of depth map capture subsystem 802-2). As shown, various surfaces of object 202 (i.e., surfaces 210-1 through 210-5) are shown in each of views 806, although it will be understood that other surfaces of object 202 may also exist that may not be visible from the perspective of either of views 806. As described above with respect to FIG. 2B, each surface 210 may include a plurality of physical points for which depth data may be captured by depth map capture subsystem 204, including, for example, physical point 212.

Confidence values may be assigned to depth data points representative of each physical point on object 202 (e.g., including physical point 212). In certain examples, as part of or in preparation for assigning confidence values to depth data points, a calibration process may be performed to convert depth data detected by each of depth map capture subsystems 802 from a local coordinate system used only by the respective depth map capture subsystem to a universal or "world" coordinate system shared by all the depth map capture subsystems included within system 100. For example, by way of the calibration process, each depth map capture subsystem 802 may be assigned a transformation matrix by which data captured by the depth map capture subsystem 802 may be compared, rotated, and/or otherwise aligned with data captured by other depth map capture subsystems 802. Based on the respective transformation matrices and the apparent positions of various physical points with respect to the world coordinate system, one depth map capture subsystem 802 (e.g., depth map capture subsystem 802-1) may correlate a particular depth data point (e.g., a depth data point representative of physical point 212) with a particular depth data point representative of a same physical point (i.e., physical point 212) captured by the other depth map capture subsystem 802 (i.e., depth map capture subsystem 802-2).

Once a first depth data point is correlated with a second depth data point corresponding to the same physical point in this manner, a confidence value may be assigned to each depth data point, and the depth data points may be converged according to the confidence values to attempt to generate a depth data point corresponding to the same physical point that may be, for example, at least as accurate as or more accurate than either the first or second depth data points. An example of how confidence values may be assigned and converged will now be provided. For clarity of description, the example will illustrate how confidence values may be assigned and converged with respect to respective depth data points captured by different depth map capture subsystems 802 but representing the same physical point (i.e., physical point 212 on surface 210-4). However, it will be understood that the principles illustrated by the following example may apply to other depth data points representing other physical points on surface 210-4, on other surfaces 210 of object 202, or on other surfaces of other objects within a real-world scene.

First, the assigning of a first confidence value to a first depth data point (e.g., the depth data point captured by depth map capture subsystem 802-1 for physical point 212) may be performed. For example, the first confidence value may be assigned based on at least one of an attribute of the particular surface that includes physical point 212 (i.e., surface 210-4) and a first viewing perspective (e.g., with respect to surface 210-4) of a component of depth map capture subsystem 802-1 capturing the first depth map (e.g., a structured light sensor, an optical sensor, a time-of-flight sensor, etc., based on the depth map capture technique used). Second, the assigning of the second confidence value to a second depth data point (e.g., the depth data point captured by depth map capture subsystem 802-2 for physical point 212) may be performed in a similar way. Specifically, the second confidence value may be assigned based on at least one of an attribute of surface 210-4 (e.g., the same or a different attribute upon which the first confidence value was based) and a second viewing perspective (e.g., with respect to surface 210-4) of a component of depth map capture subsystem 802-2 capturing the second depth map.

Confidence values may be assigned based on any suitable attribute of a surface. For example, system 100 may determine that one attribute of surface 210-4 (of which physical point 212 is a part) is that surface 210-4 is relatively smooth. Accordingly, since structured light depth map capture techniques may be more effective with smooth surfaces than, for example, stereoscopic depth map capture techniques (as described above), system 100 may be more likely to assign a higher confidence value to a depth data point representative of physical point 212 (or other physical points on surface 210-4) if a structured light depth map capture technique is used to capture the depth data point, than if, for example, a stereoscopic depth map capture technique is used to capture the depth data point.

Similarly, confidence values may be assigned based on other attributes of surfaces such as how textured or non-textured (e.g., smooth, featureless, etc.) the surfaces are, how near or far the surfaces are from the depth map capture subsystems, how well or poorly lit the surfaces are, the degree to which the surfaces absorb or reflect light at certain frequencies (e.g., a particular frequency emitted for a structured light pattern), and various other attributes as may serve a particular implementation.

Attributes may be determined for each physical point on a particular surface based on attributes of physical points surrounding the physical point on the particular surface, attributes of physical points defining the particular surface (e.g., physical points at corners or edges of the surface), or by any other suitable physical points detected by the depth map capture subsystems and/or using any suitable algorithms or techniques for determining attributes of object surfaces in an image (e.g., computer vision techniques and/or algorithms for extracting features such as graph cuts, belief propagation, extrapolation from Harris corners, etc.). For example, a surface may be determined to be smooth if a physical point on the surface is surrounded by various other physical points that look very similar to the physical point such that a derivative from point to point shows little change between points, while a surface may be determined to be more textured if the derivative shows greater or more abrupt changes from point to point.

Confidence values may also be assigned based on a viewing perspective (e.g., with respect to a surface upon which a physical point is included) of the sensing component (e.g., structured light sensor, optical sensor, time-of-flight sensor, etc.) of the depth map capture subsystem 802 in any way as may serve a particular implementation. For example, as illustrated in view 806-1, system 100 may determine that relatively effective (e.g., accurate) depth data may be captured for physical point 212 based on the perspective of the sensing component of depth map capture subsystem 802-1 because surface 210-4 can be analyzed fairly straight-on from the perspective of depth map capture subsystem 802-1. Accordingly, system 100 may assign a relatively high confidence value to a depth data point captured by depth map capture subsystem 802-1. Conversely, as illustrated in view 806-2, system 100 may determine that depth data for physical point 212 may be unlikely to be particularly effective or accurate based on the perspective of the sensing component of depth map capture subsystem 802-2 because surface 210-4 must be analyzed from a fairly sharp angle from the perspective of depth map capture subsystem 802-2, making the depth data of physical point 212 more difficult to correctly capture.

Various other factors may also be used alone or in conjunction with either or both of the factors described above (i.e., the attributes of a surface and the perspective or viewing angle that a depth map capture subsystem has with respective to the surface) to assign confidence values. For example, if physical point 212 is captured by multiple depth map capture subsystems associated with one node (e.g., multiple depth map capture subsystems on multiple camera rigs), a confidence value assigned for a depth map associated with the entire node (e.g., formed from converging one or more depth maps associated with the multiple camera rigs) may be higher than if physical point 212 is only captured by one depth map capture subsystem associated with the node. Similarly, other factors may be used to assign confidence values as may serve a particular implementation.

Once system 100 accesses the independently-captured depth maps and assigns confidence values to depth data points within the depth maps, system 100 may generate a converged depth map by converging depth data points included in the independently-captured depth maps based on the assigned confidence values in any suitable way. For instance, to continue with the example of physical point 212 described above, system 100 may generate a third, converged depth data point from the first and second depth data points captured by each of depth map capture subsystems 802 by assigning to the third depth data point whichever of the first and second depth data points have been assigned a higher confidence value. More specifically, system 100 may generate the third depth data point by identifying a maximum confidence value from the first and second confidence values and, if the maximum confidence value is the first confidence value, assigning the first depth data point to the third depth data point, and, if the maximum confidence value is the second confidence value, assigning the second depth data point to the third depth data point. If the confidence values are equal in this example, system 100 may choose the first or second depth data point to assign to the third depth data point, average the depth data point, or otherwise break the tie in any way as may serve a particular implementation.

Alternatively, system 100 may generate the third depth data point as a weighted average of the first and second depth data points in accordance with the first and second confidence values. For example, system 100 may mathematically determine, and assign to the third depth data point, a depth data point between the first and second depth data points that is closer to one depth data point or the other based on how high the confidence value is for each depth data point. In other words, if the first depth data point has been assigned a relatively high confidence value and the second depth data point has been assigned a relatively low confidence value, system 100 may generate a third depth data point between the first and second depth data points that is closer to the first depth data point than to the second depth data point due to the higher confidence value assigned to the first depth data point.

Figure 9:
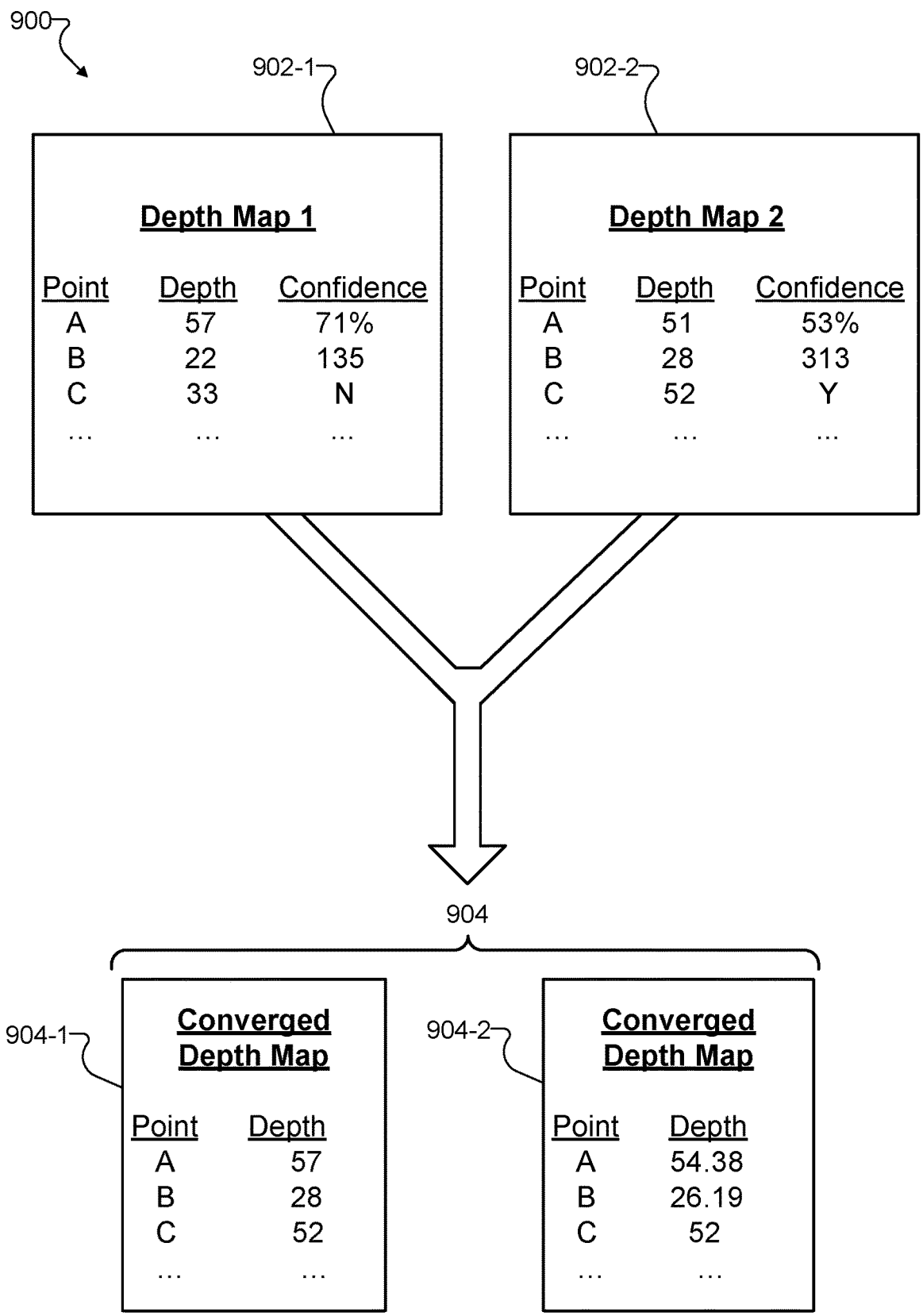
FIG. 9 illustrates an exemplary converging of two independently-captured depth maps into exemplary converged depth maps according to principles described herein.

To illustrate, FIG. 9 illustrates an exemplary converging 900 of two independently-captured depth maps 902 (i.e., depth maps 902-1 and 902-2) into exemplary converged depth maps 904 (i.e., converged depth maps 904-1 and 904-2). The depth maps illustrated in FIG. 9 (i.e., depth maps 902, as well as converged depth maps 904) illustrate depth data under columns labeled "Depth" for a relatively small number of depth data points under columns labeled "Point." While the depth maps of FIG. 9 are relatively simple (e.g., including only one-dimensional depth data for only three depth data points) for clarity of illustration and description, it will be understood that depth maps generated by system 100 may be considerably more complex and/or comprehensive. For example, depth maps generated by system 100 may include hundreds, thousands, or even more depth data points, each of which may be associated with various dimensions of depth data. For instance, in some implementations, three dimensions of depth data (e.g., corresponding to orthogonal x, y, and z coordinates) may be captured and associated with each depth data point. While converging 900 illustrates two independently-captured depth maps being converged to form a converged depth map, the principles described may similarly apply to an arbitrary number of independently-captured depth maps (e.g., more than two depth maps) being converged to form the converged depth map.

Depth maps 902 may be independently captured by way of any of the depth map capture techniques and/or from any of the fixed positions or configurations described herein. Each depth data point (i.e., A, B, C) represented in depth maps 902 may correspond to a particular physical point included on a surface of an object in a real-world scene. For example, depth data point A may correspond with physical point 212, illustrated in FIGS. 2 and 8, while depth data points B and C may correspond with other physical points on surfaces 210 of object 202 or with physical points on other surfaces of other objects within the real-world scene in which object 202 is included. Regardless, due to alignment and calibration performed as described above, depth data point A in depth map 902-1 may be representative of the same physical point as depth data point A in depth map 902-2 and depth data point A in both of converged depth maps 904, and so forth.

Along with columns identifying the depth data point and the corresponding depth that has been captured for each depth data point, depth maps 902 further include columns labeled "Confidence" in which an assigned confidence value for each depth data point is shown. In some examples, the confidence value for each depth data point may be assigned based on a single scale and/or paradigm (e.g., confidence percentage values, raw confidence values based on a particular scale, binary pass/fail-type confidence values, etc.). However, to illustrate different paradigms that may be used, each depth data point in FIG. 9 is assigned a different type of confidence value. Specifically, as shown in depth maps 902, depth data point A is assigned a confidence percentage value (i.e., 71% in the case of depth map 902-1 and 53% in the case of depth map 902-2), depth data point B is assigned a raw confidence value based on a particular scale such as a scale from 0 to 499 (i.e., 135 in the case of depth map 902-1 and 313 in the case of depth map 902-2), and depth data point C is assigned a binary (e.g., pass/fail-type) confidence value (i.e., N to represent "No" confidence in the case of depth map 902-1 and "Y" to represent "Yes" confidence in the case of depth map 902-2).

Converged depth maps 904 illustrate two alternative converged depth maps that system 100 may generate from depth maps 902 based on how system 100 is configured to perform the converging of the depth maps. Specifically, converged depth map 904-1 illustrates an example where system 100 assigns to each depth data point in converged depth map 904-1 whichever of the respective first and second depth data points have been assigned a higher confidence value. As shown, because depth map 902-1 has a higher confidence value for depth data point A (i.e., 71% rather than 53%), depth data point A in converged depth map 904-1 is assigned 57 (i.e., the depth data associated with depth data point A in depth map 902-1). Because depth map 902-2 has a higher confidence value for depth data point B (i.e., 313 rather than 135), depth data point B in converged depth map 904-1 is assigned 28 (i.e., the depth data associated with depth data point B in depth map 902-2). Similarly, because depth map 902-2 has a higher confidence value for depth data point C (i.e., Y rather than N), depth data point C in converged depth map 904-1 is assigned 52 (i.e., the depth data associated with depth data point C in depth map 902-2).

As an alternative example, converged depth map 904-2 illustrates an example where system 100 assigns to each depth data point in converged depth map 904-2 a weighted average of the first and second depth data points in accordance with the first and second confidence values in depth maps 902. Specifically, as shown, system 100 assigns 54.38 to depth data point A in converged depth map 904-2 based on a weighted calculation of the respective depth data values captured by depth maps 902 (i.e., 57 and 51, respectively) that takes into account the respective confidence values associated with each depth data value. Specifically, the weighting results in the converged depth data for depth data point A (i.e., 54.38) being closer to a depth data value of 57 (i.e., the depth data value for depth data point A in depth map 902-1 which is associated with a higher confidence value of 71%) than to a depth data value of 51 (i.e., the depth data value for depth data point A in depth map 902-2, which is associated with a lower confidence value of 53%). Similarly, the converged depth data value for depth data point B is 26.19, which is closer to the depth data value of 28 in depth map 902-2 than to the depth data value of 22 in depth map 902-1 due to the higher confidence value of depth map 902-2. Because depth map 902-1 has no confidence for depth data point C, the converged depth data value for depth data point C in converged data map 904-2 may be 52 to reflect the only depth data value for which sufficient confidence is indicated.

It will be understood that variants of these techniques for converging depth data from depth maps 902-1 and 902-2 into depth data of a converged depth map 904, a combination of these techniques, or other suitable techniques different from these techniques may be employed in certain examples as may serve a particular implementation.

Figure 10:
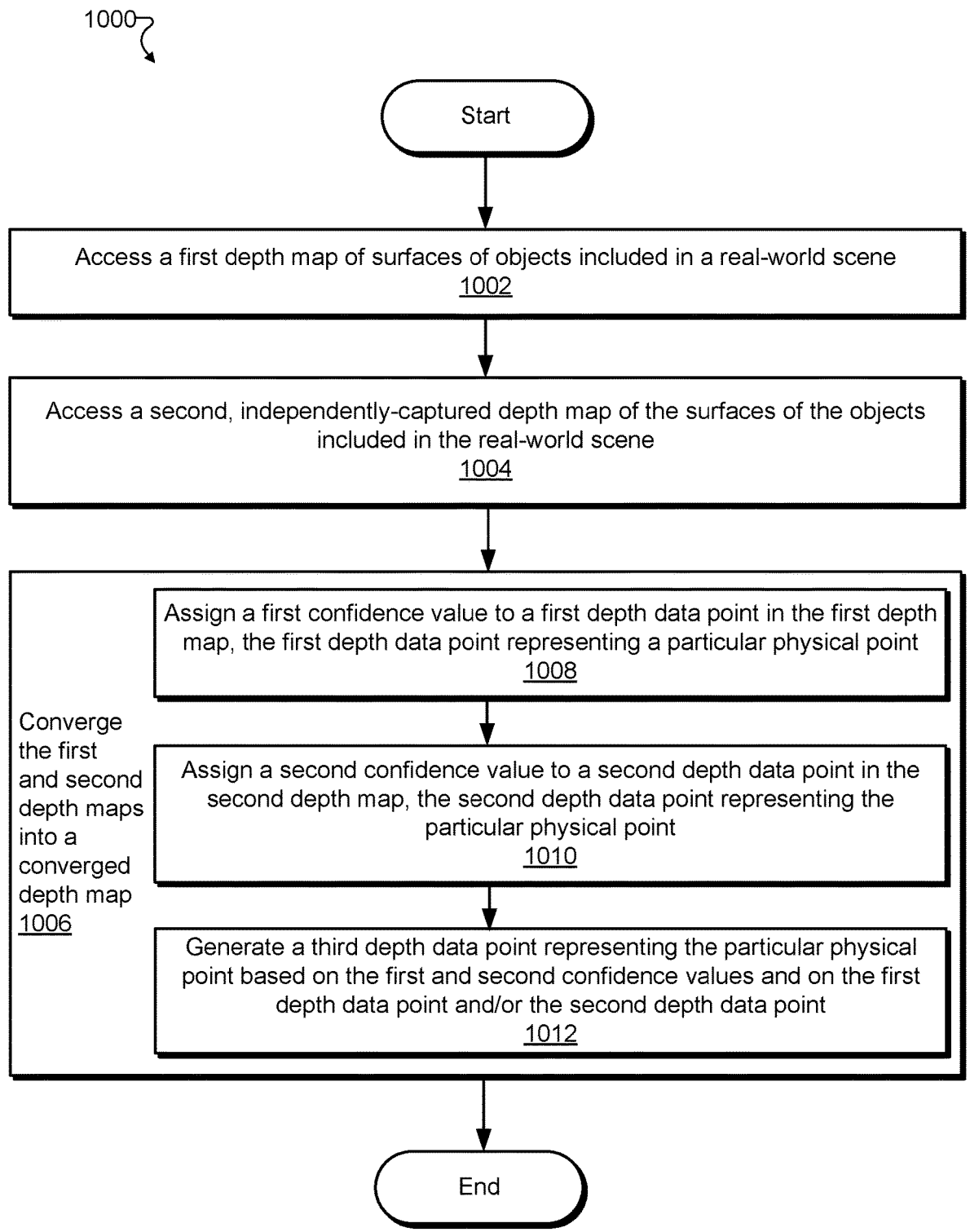
FIGS. 10-11 illustrate exemplary methods for generating depth data by converging independently-captured depth maps according to principles described herein.

FIG. 10 illustrates an exemplary method 1000 for generating depth data by converging independently-captured depth maps. While FIG. 10 illustrates exemplary operations according to one embodiment, other embodiments may omit, add to, reorder, and/or modify any of the operations shown in FIG. 10. One or more of the operations shown in FIG. 10 may be performed by system 100 and/or any implementation thereof.

In operation 1002, a depth data generation system may access a first depth map of surfaces of objects included in a real-world scene. For example, the first depth map may include a first plurality of depth data points each representative of a different physical point included in a plurality of physical points on the surfaces of the objects included in the real-world scene. Operation 1002 may be performed in any of the ways described herein.

In operation 1004, the depth data generation system may access a second depth map of the surfaces of the objects included in the real-world scene. The second depth map accessed in operation 1004 may have been captured independently from the first depth map accessed in operation 1002. Additionally, the second depth map may include a second plurality of depth data points each representative of a different physical point included in the plurality of physical points on the surfaces of the objects included in the real-world scene. Operation 1004 may be performed in any of the ways described herein.

In operation 1006, the depth data generation system may converge the first and second depth maps into a converged depth map of the surfaces of the objects included in the real-world scene. For example, the converged depth map may include a third plurality of depth data points each representative of a different physical point included in the plurality of physical points on the surfaces of the objects included in the real-world scene. Operation 1006 may be performed in any of the ways described herein. For example, as illustrated in FIG. 10, operation 1006 may be performed by performing operations 1008 through 1012, described below.

In operation 1008, the depth data generation system may assign a first confidence value to a first depth data point in the first plurality of depth data points of the first depth map. For example, the first depth data point may represent a particular physical point included in the plurality of physical points. Operation 1008 may be performed in any of the ways described herein.

In operation 1010, the depth data generation system may assign a second confidence value to a second depth data point in the second plurality of depth data points of the second depth map. In some examples, the second depth data point, like the first depth data point, may also represent the particular physical point. Operation 1010 may be performed in any of the ways described herein.

In operation 1012, the depth data generation system may generate a third depth data point in the third plurality of depth data points. The third depth data point may also represent the particular physical point. Operation 1012 may be performed in any of the ways described herein. For example, the third depth data point may be generated based on the first and second confidence values and on at least one of the first depth data point in the first plurality of depth data points and the second depth data point in the second plurality of depth data points.

Figure 11:
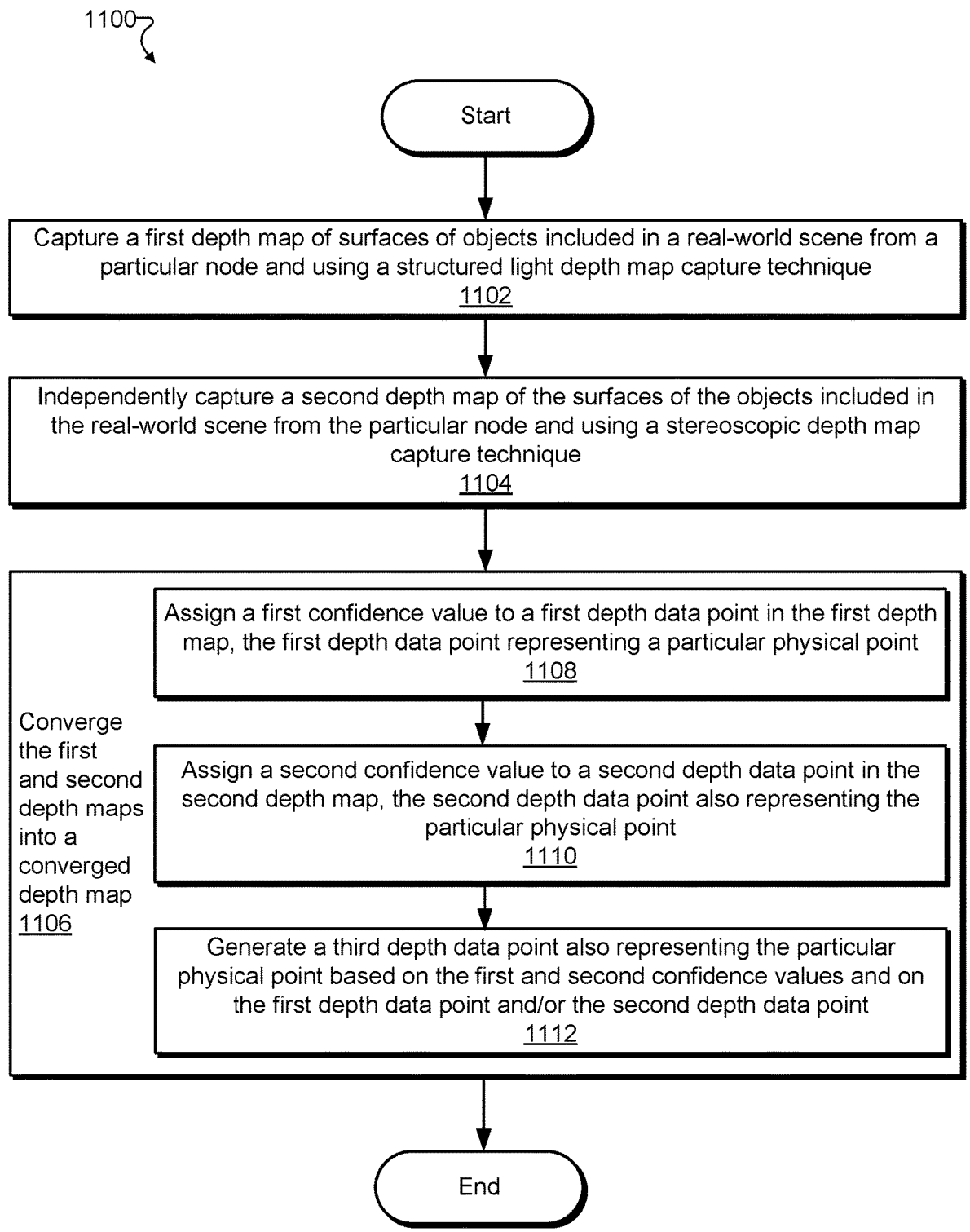

FIG. 11 illustrates an exemplary method 1100 for generating depth data by converging independently-captured depth maps. While FIG. 11 illustrates exemplary operations according to one embodiment, other embodiments may omit, add to, reorder, and/or modify any of the operations shown in FIG. 11. One or more of the operations shown in FIG. 11 may be performed by system 100 and/or any implementation thereof.

In operation 1102, a depth data generation system may capture a first depth map of surfaces of objects included in a real-world scene. For example, the first depth map may include a first plurality of depth data points each representative of a different physical point included in a plurality of physical points on the surfaces of the objects included in the real-world scene. Operation 1102 may be performed in any of the ways described herein. For example, the first depth map may be captured from a particular node disposed at a particular fixed node position with respect to the real-world scene and using a structured light depth map capture technique.

In operation 1104, the depth data generation system may capture a second depth map of the surfaces of the objects included in the real-world scene. The second depth map may be captured in operation 1104 independently from the capturing of the first depth map in operation 1102. The second depth map may include a second plurality of depth data points each representative of a different physical point included in the plurality of physical points on the surfaces of the objects included in the real-world scene. Operation 1104 may be performed in any of the ways described herein. For example, the second depth map may be captured from the same particular node disposed at the same particular fixed node position from which the first depth map is captured in operation 1102. However, in contrast with operation 1102, operation 1104 may be performed using a stereoscopic depth map capture technique.

In operation 1106, the depth data generation system may converge the first and second depth maps into a converged depth map of the surfaces of the objects included in the real-world scene. For example, the converged depth map may include a third plurality of depth data points each representative of a different physical point included in the plurality of physical points on the surfaces of the objects included in the real-world scene. Operation 1106 may be performed in any of the ways described herein. For example, as illustrated in FIG. 11, operation 1106 may be performed by performing operations 1108 through 1112, described below.

In operation 1108, the depth data generation system may assign a first confidence value to a first depth data point in the first plurality of depth data points of the first depth map. For example, the first depth data point may represent a particular physical point included in the plurality of physical points. Operation 1108 may be performed in any of the ways described herein.

In operation 1110, the depth data generation system may assign a second confidence value to a second depth data point in the second plurality of depth data points of the second depth map. In some examples, the second depth data point, like the first depth data point, may also represent the particular physical point. Operation 1110 may be performed in any of the ways described herein.

In operation 1112, the depth data generation system may generate a third depth data point in the third plurality of depth data points. The third depth data point may also represent the particular physical point. Operation 1112 may be performed in any of the ways described herein. For example, the third depth data point may be generated based on the first and second confidence values and on at least one of the first depth data point in the first plurality of depth data points and the second depth data point in the second plurality of depth data points.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
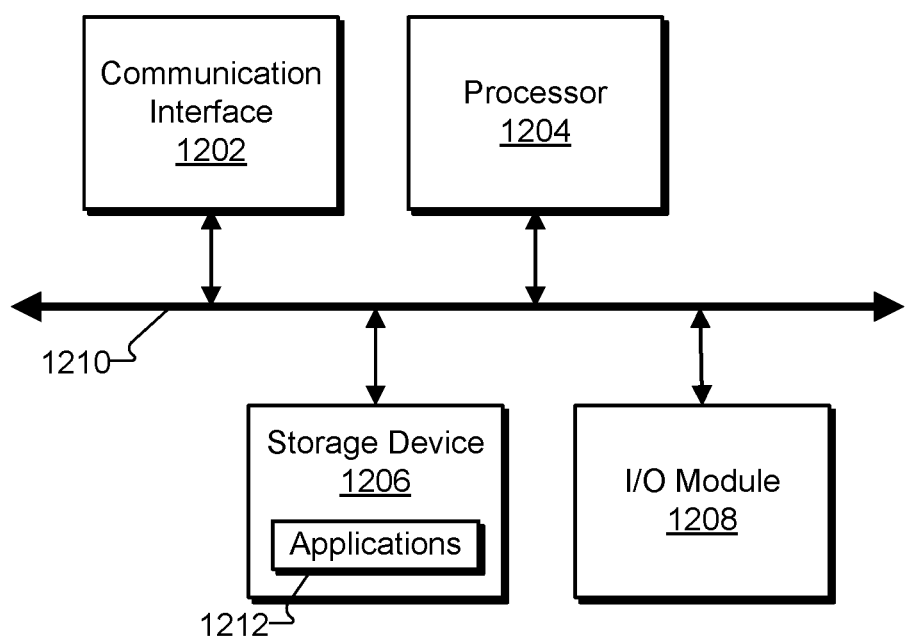
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual reality experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with depth map access facility 102 or depth map convergence facility 104 (see FIG. 1). Likewise, storage facility 106 of system 100 may be implemented by or within storage device 1206.

To the extent the aforementioned embodiments collect, store, and/or employ personal information provided by individuals, it should be understood that such information shall be user in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    accessing, by a depth data generation system, a first depth map of a real-world scene, the first depth map captured using a first depth map capture technique and including a first depth data point representative of a physical point located on a surface of an object in the real-world scene;
    accessing, by the depth data generation system, a second depth map of the real-world scene, the second depth map captured independently from the first depth map using a second depth map capture technique and including a second depth data point representative of the physical point on the surface of the object;
    assigning, by the depth data generation system based on the first depth map capture technique and based on an attribute of the surface upon which the physical point is located, a first confidence value to the first depth data point of the first depth map;
    assigning, by the depth data generation system based on the second depth map capture technique and based on the attribute of the surface upon which the physical point is located, a second confidence value to the second depth data point of the second depth map; and
    converging, by the depth data generation system based on the first and second confidence values, the first and second depth maps to form a converged depth map of the real-world scene, the converged depth map including a third depth data point representative of the physical point on the surface of the object.

2. The method of claim 1, further comprising:
    generating, by the depth data generation system based on the converged depth map, a data stream representative of a dynamic volumetric model of the real-world scene, the dynamic volumetric model configured to be used to generate virtual reality media content, the virtual reality media content
        configured to be presented by a media player device to a user experiencing the virtual reality media content, and
        representative of the real-world scene as experienced from a dynamically selectable viewpoint corresponding to an arbitrary location within the real-world scene, the dynamically selectable viewpoint selected by the user while the user is experiencing the real-world scene using the media player device; and
    providing, by the depth data generation system to the media player device and based on the data stream, the virtual reality media content representative of the real-world scene.

3. The method of claim 1, wherein the attribute upon which the assigning of the first and second confidence values is based is a smoothness attribute characterizing how textured or non-textured is the surface upon which the physical point is located.

4. The method of claim 3, wherein the assigning of the first and second confidence values based on the smoothness attribute of the surface upon which the physical point is located includes determining the smoothness attribute by computing, using a derivative function to compare an appearance of the physical point and an appearance of one or more other physical points surrounding the physical point on the surface of the object, a degree to which the appearance of the physical point differs from the appearance of the one or more other physical points surrounding the physical point on the surface of the object.

5. The method of claim 1, wherein the attribute upon which the assigning of the first and second confidence values is based is a lighting attribute characterizing how well or poorly lit is the surface upon which the physical point is located.

6. The method of claim 1, wherein the attribute upon which the assigning of the first and second confidence values is based is a glare attribute characterizing a degree to which light of a particular frequency is absorbed by or reflected from the surface upon which the physical point is located.

7. The method of claim 1, wherein, along with being based on the attribute of the surface upon which the physical point is located and the first or second depth map capture techniques, respectively, the assigning of the first and second confidence values is further based on a number of depth map capture subsystems, from a plurality of depth map capture subsystems associated with a node, that capture the physical point.

8. The method of claim 1, wherein the converging of the first and second depth maps to form the converged depth map of the real-world scene includes generating the third depth data point by performing one of:
- identifying a maximum confidence value from the first and second confidence values and,
  - if the maximum confidence value is the first confidence value, assigning the first depth data point to the third depth data point, and
  - if the maximum confidence value is the second confidence value, assigning the second depth data point to the third depth data point; and
- generating the third depth data point as a weighted average of the first and second depth data points in accordance with the first and second confidence values.

9. The method of claim 1, wherein the first depth map capture technique used to capture the first depth map is a same depth map capture technique as the second depth map capture technique used to capture the second depth map.

10. The method of claim 9, wherein:
- the depth data generation system includes a plurality of nodes each disposed at a different fixed node position in a plurality of fixed node positions with respect to the real-world scene;
- the capturing of the first depth map is performed from a first node in the plurality of nodes;
- the capturing of the second depth map is performed from a second node in the plurality of nodes, the second node disposed at a different fixed node position than the first node in the plurality of fixed node positions.

11. The method of claim 1, embodied as computer-executable instructions on at least one non-transitory computer-readable medium.

12. A method comprising:
- accessing, by a depth data generation system, a first depth map of a real-world scene, the first depth map captured by a first depth map capture subsystem and including a first depth data point representative of a physical point located on a surface of an object in the real-world scene;
- accessing, by the depth data generation system, a second depth map of the real-world scene, the second depth map captured independently from the first depth map by a second depth map capture subsystem and including a second depth data point representative of the physical point on the surface of the object;
- assigning, by the depth data generation system based on a first viewing perspective of the first depth map capture subsystem with respect to the surface upon which the physical point is located, a first confidence value to the first depth data point of the first depth map;
- assigning, by the depth data generation system based on a second viewing perspective of the second depth map capture subsystem with respect to the surface upon which the physical point is located, a second confidence value to the second depth data point of the second depth map; and
- converging, by the depth data generation system based on the first and second confidence values, the first and second depth maps to form a converged depth map of the real-world scene, the converged depth map including a third depth data point representative of the physical point on the surface of the object.

13. The method of claim 12, further comprising:
- generating, by the depth data generation system based on the converged depth map, a data stream representative of a dynamic volumetric model of the real-world scene, the dynamic volumetric model configured to be used to generate virtual reality media content, the virtual reality media content
  - configured to be presented by a media player device to a user experiencing the virtual reality media content, and
  - representative of the real-world scene as experienced from a dynamically selectable viewpoint corresponding to an arbitrary location within the real-world scene, the dynamically selectable viewpoint selected by the user while the user is experiencing the real-world scene using the media player device; and
- providing, by the depth data generation system to the media player device and based on the data stream, the virtual reality media content representative of the real-world scene.

14. The method of claim 12, wherein:
- along with being based on the first viewing perspective, the assigning of the first confidence value is further based on
  - a first depth map capture technique used to capture the first depth map, and
  - an attribute of the surface upon which the physical point is located; and
- along with being based on the second viewing perspective, the assigning of the second confidence value is further based on
  - a second depth map capture technique used to capture the second depth map, and
  - the attribute of the surface upon which the physical point is located.

15. The method of claim 12, embodied as computer-executable instructions on at least one non-transitory computer-readable medium.

16. A system comprising:
a memory storing instructions; and
a processor communicatively coupled to the memory and configured to execute the instructions to:
   access a first depth map of a real-world scene, the first depth map captured using a first depth map capture technique and including a first depth data point representative of a physical point located on a surface of an object in the real-world scene;
   access a second depth map of the real-world scene, the second depth map captured independently from the first depth map using a second depth map capture technique and including a second depth data point representative of the physical point on the surface of the object;
   assign, based on the first depth map capture technique and based on an attribute of the surface upon which the physical point is located, a first confidence value to the first depth data point of the first depth map;
   assign, based on the second depth map capture technique and based on the attribute of the surface upon which the physical point is located, a second confidence value to the second depth data point of the second depth map; and
   converge, based on the first and second confidence values, the first and second depth maps to form a converged depth map of the real-world scene, the converged depth map including a third depth data point representative of the physical point on the surface of the object.

17. The system of claim 16, wherein the processor is further configured to execute the instructions to:
   generate, based on the converged depth map, a data stream representative of a dynamic volumetric model of the real-world scene, the dynamic volumetric model configured to be used to generate virtual reality media content, the virtual reality media content
      configured to be presented by a media player device to a user experiencing the virtual reality media content, and
      representative of the real-world scene as experienced from a dynamically selectable viewpoint corresponding to an arbitrary location within the real-world scene, the dynamically selectable viewpoint selected by the user while the user is experiencing the real-world scene using the media player device; and
   provide, to the media player device based on the data stream, the virtual reality media content representative of the real-world scene.

18. The system of claim 16, wherein the attribute upon which the assigning of the first and second confidence values is based is a smoothness attribute characterizing how textured or non-textured is the surface upon which the physical point is located.

19. The system of claim 16, wherein the attribute upon which the assigning of the first and second confidence values is based is a lighting attribute characterizing how well or poorly lit is the surface upon which the physical point is located.

20. The system of claim 16, wherein the attribute upon which the assigning of the first and second confidence values is based is a glare attribute characterizing a degree to which light of a particular frequency is absorbed by or reflected from the surface upon which the physical point is located.

* * * * *